(12) United States Patent
Okuyama et al.

(10) Patent No.: US 7,064,773 B1
(45) Date of Patent: Jun. 20, 2006

(54) DISPLAY APPARATUS

(75) Inventors: Atsushi Okuyama, Tokorozawa (JP); Makoto Matsuura, Chigasaki (JP); Akihiro Ouchi, Ebina (JP); Hiroyuki Kodama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/537,025

(22) Filed: Mar. 28, 2000

(30) Foreign Application Priority Data

Mar. 30, 1999 (JP) ............................................. 11-089196
Oct. 12, 1999 (JP) ............................................. 11-289374

(51) Int. Cl.
G09G 5/02 (2006.01)

(52) U.S. Cl. ....................................... 345/690; 348/676

(58) Field of Classification Search ................. 345/600, 345/690; 348/674, 675, 676, 191, 742, 743; 353/31

See application file for complete search history.

(56) References Cited

U.S. PATENT DOCUMENTS

| | | | | | |
|---|---|---|---|---|---|
| 4,868,668 A | * | 9/1989 | Tavernetti | ..................... | 348/675 |
| 5,428,408 A | * | 6/1995 | Stanton | ..................... | 348/742 |
| 6,054,832 A | * | 4/2000 | Kunzman et al. | ........... | 348/743 |
| 6,108,053 A | * | 8/2000 | Pettitt et al. | ................. | 348/743 |
| 6,115,022 A | * | 9/2000 | Mayer et al. | ................ | 345/418 |
| 6,256,425 B1 | * | 7/2001 | Kunzman | ..................... | 348/743 |
| 6,392,717 B1 | * | 5/2002 | Kunzman | ..................... | 348/742 |

FOREIGN PATENT DOCUMENTS

| | | | |
|---|---|---|---|
| JP | 7-72454 | | 3/1995 |
| JP | 07-072450 | * | 3/1995 |
| JP | 07-318883 | | 12/2005 |

* cited by examiner

*Primary Examiner*—Jeffery Brier
(74) *Attorney, Agent, or Firm*—Morgan & Finnegan, LLP

(57) ABSTRACT

A display apparatus is constructed to make a plurality of light beams of mutually different colors incident to a display element and modulate the beams of the respective colors by the display element to form images of the respective colors. Purity of a predetermined color out of the colors is variable and a control pattern of the image display element is modified according to variation in the purity of the predetermined color.

10 Claims, 34 Drawing Sheets

CHOROMATICITY DIAGRAM

CHOROMATICITY DIAGRAM

CHROMATICITY DIAGRAM

CHROMATICITY DIAGRAM

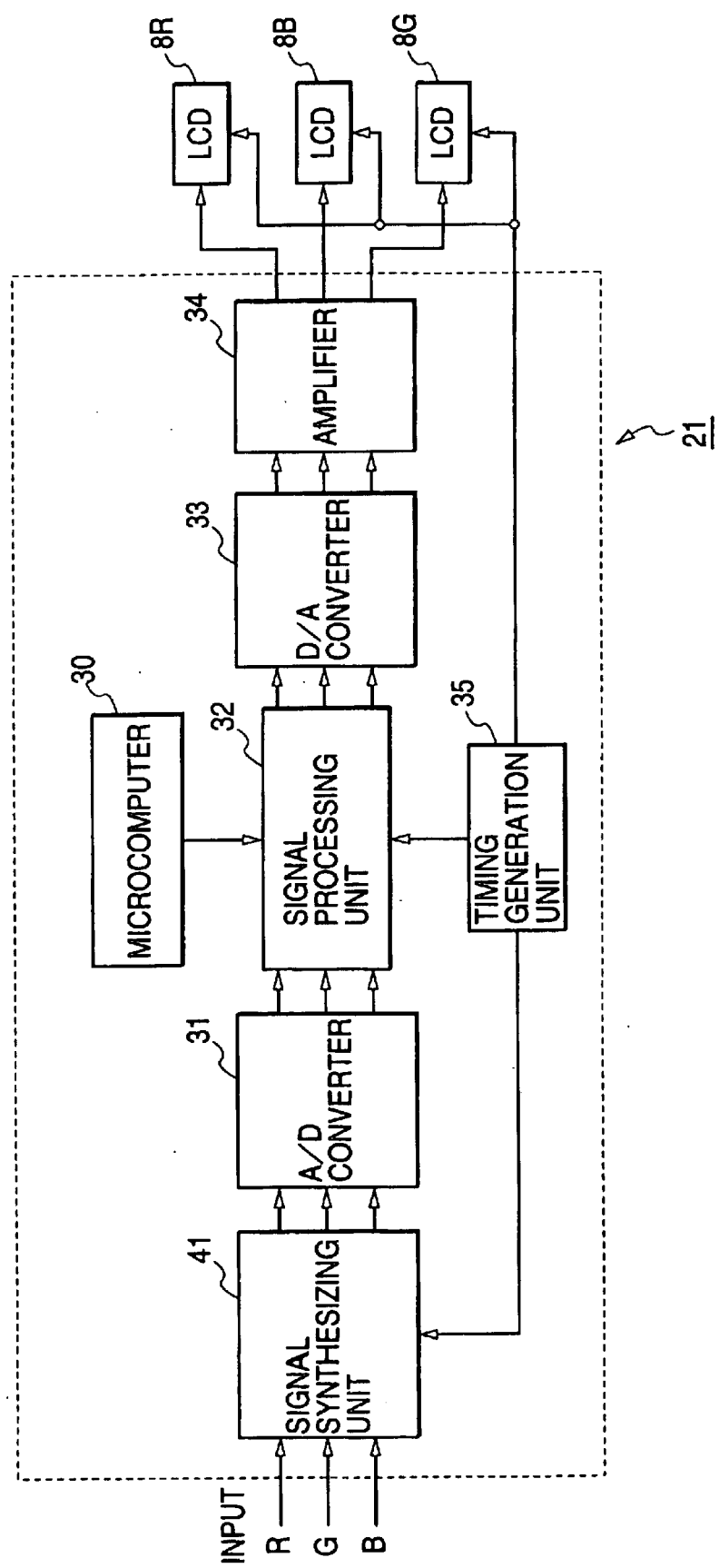

FIG. 26
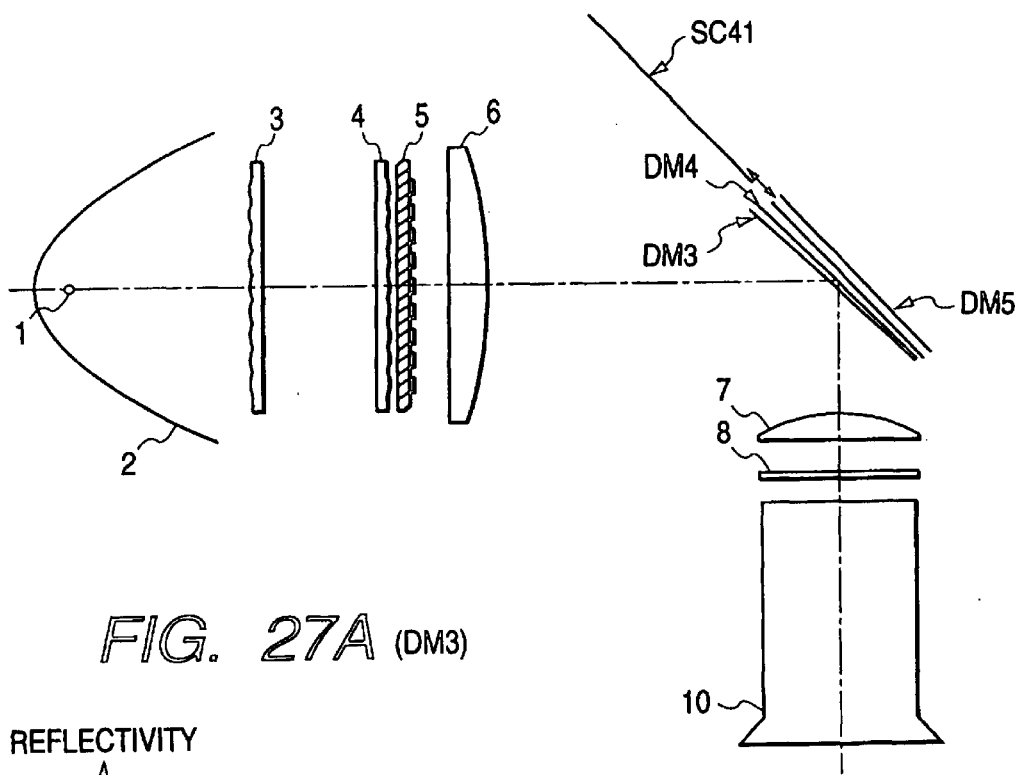
FIG. 27A (DM3)
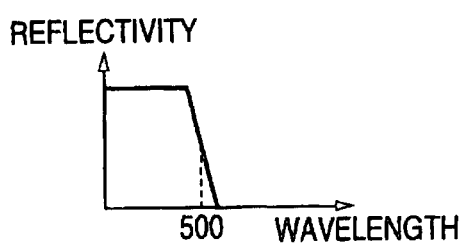
FIG. 27B (DM4)
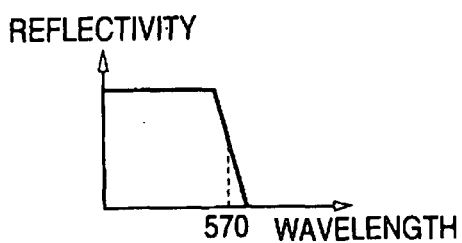
FIG. 27C (DM5)
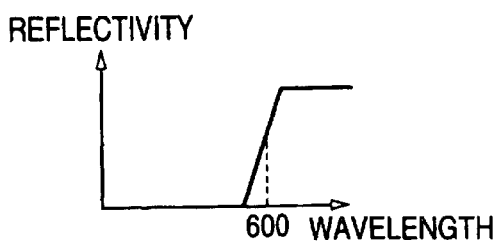

FIG. 31
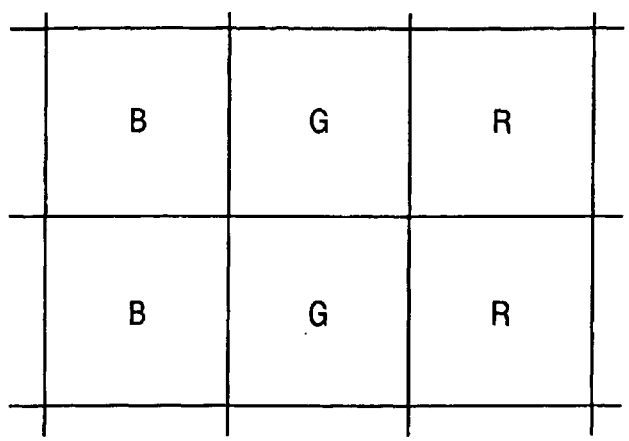
FIG. 32
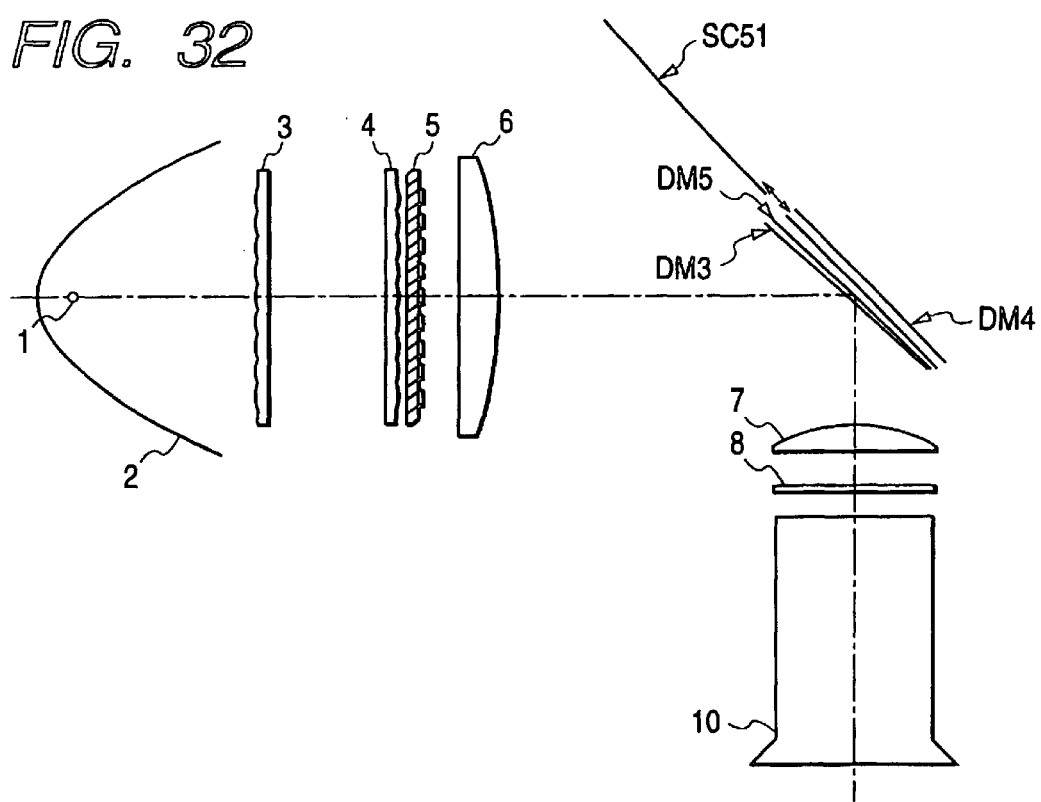
FIG. 33 (SC51)
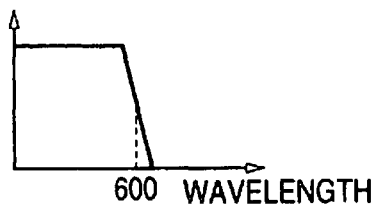

-- PRIOR ART --

-- PRIOR ART --

-- PRIOR ART --

-- PRIOR ART --

-- PRIOR ART --

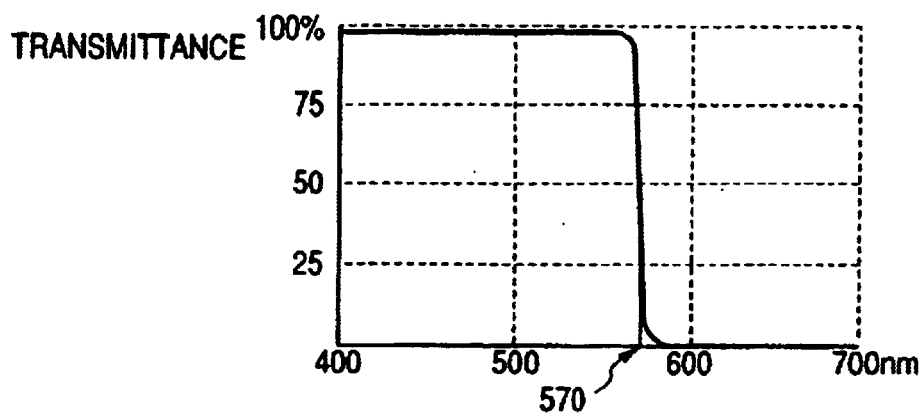
FIG. 41A -- PRIOR ART --
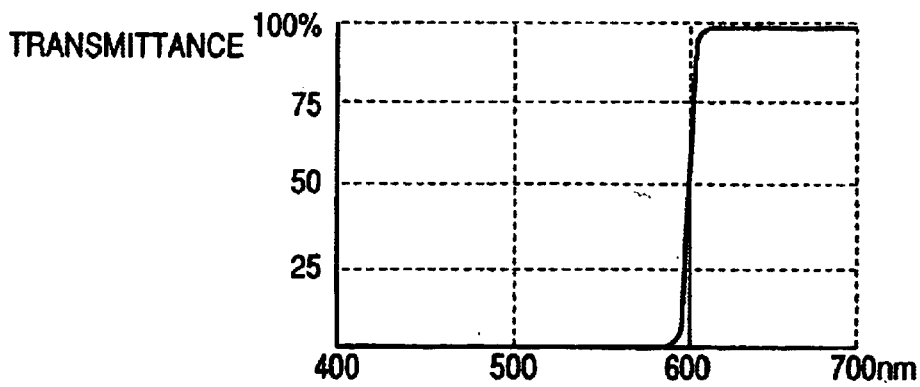
FIG. 41B -- PRIOR ART --
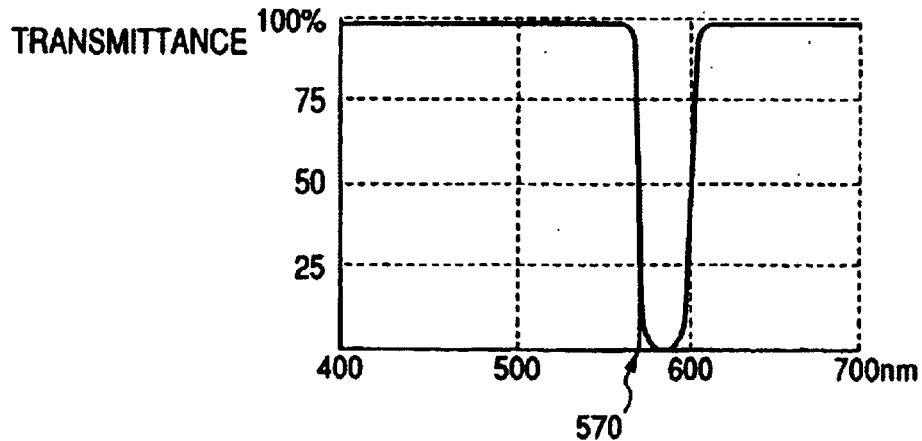
FIG. 42 -- PRIOR ART --

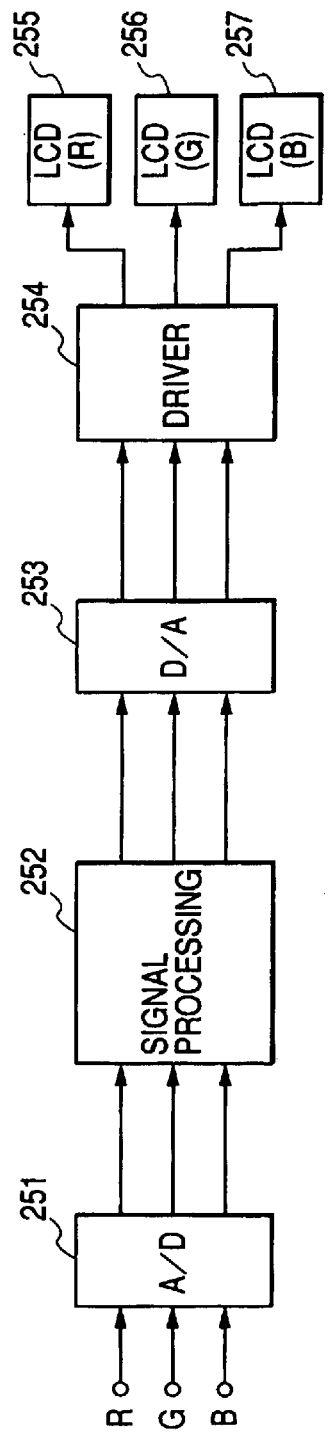
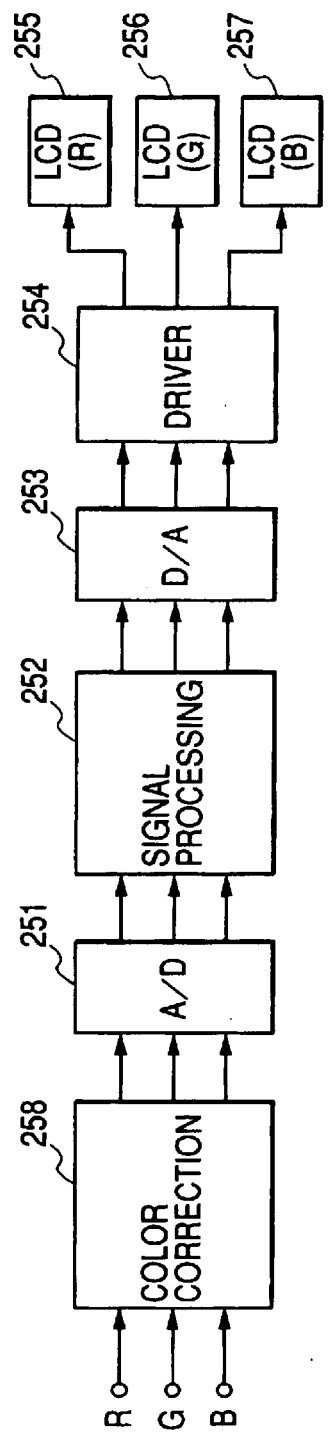

DISPLAY APPARATUS

BACKGROUND OF THE INVENTION

1. Field of the Invention

The present invention relates to a display apparatus such as a projection display apparatus used for large-screen display of still picture or moving picture (video display), and so on.

2. Related Background Art

In recent years the variety of uses for the projection display apparatus have been increasing, for example, including display of an image of a computer in presentation with the computer, display of a video image of television, and so on, and there are thus demands for the display apparatus capable of gaining optimum chromatic purity, color balance, illuminance, etc. for a projected image in accordance with the uses.

FIG. 37 shows an example of the conventional projection display apparatus.

In FIG. 37, white light emitted from a lamp unit 100, which has a light source 101 and a reflector 102 for reflecting light from the light source, travels via fly's eye lens arrays 103 and 104, a polarization converting element array 105, a condenser lens 106, a total reflection mirror M0, etc. and thereafter is separated into light beams having their respective wavelength bands of red, green, and blue by dichroic mirrors DM1, DM2. The blue light travels via a reflection mirror M1 and a condenser lens 107B to enter an image display element 108B for blue image, the green light travels via a condenser lens 107G to enter an image display element 108G for green image, and the red light travels via a condenser lens 109, a reflection mirror M2, a relay lens 110, a reflection mirror M3, and a condenser lens 107R to enter an image display element 108R for red image. The color beams (color images) from the respective display elements are incident to a dichroic prism DP as an optical system for composition of colors to be combined into one, and the combined light of the three colors is magnified and projected onto an unrepresented screen or the like by a projection lens 111. On the screen a composite image (full color image) from the images displayed on the image display elements 108R, 108G, and 108B is formed as an enlarged image.

In FIG. 37 the light source 101 used herein is a discharge lamp such as a metal halide lamp, a mercury lamp, or the like.

FIG. 38 shows a spectral distribution of the discharge lamp as described above and the spectral distribution generally demonstrates a continuous intensity distribution in the wavelength band of the visible light ranging from 400 nm to 700 nm.

In the projection display apparatus of the aforementioned conventional example, if the wavelength band of 570 nm to 600 nm is taken into the green light when the color separation system including the dichroic mirrors DM1, DM2 separates the white light into the color beams of red, green, and blue, green will become yellow and thus the pure color of green will become hard to express. If the wavelength band of 570 nm to 600 nm is taken into the component of the red light otherwise, red will become orange and thus the pure color of red will become hard to express. For this reason, the apparatus is constructed to have dichroic filters or the like on the light incidence side of some image display elements, in addition to the dichroic mirrors DM1, DM2, and these filters eliminate the light in the wavelength band of 570 nm to 600 nm, so as to prevent the light component in the wavelength band of 570 nm to 600 nm from arriving at each of the image display elements for green and for red.

FIG. 39 is a spectral distribution of white light combined by the dichroic prism DP after the light in the wavelength band of 570 nm to 600 nm is eliminated.

FIG. 40A and FIG. 40B show spectral transmittances of the dichroic mirrors DM1, DM2 in the structure of the projection display apparatus of the aforementioned conventional example, and FIG. 41A and FIG. 41B show spectral transmittances of the dichroic filters DF1, DF2 necessary for elimination of the light in the wavelength region of 570 nm to 600 nm, where the dichroic filters DF1 and DF2 are placed on the light incidence side of the image display element 108G for green image and on the light incidence side of the image display element 108R for red image, respectively.

Moreover, Japanese Patent Application Laid-Open No. 7-72450 describes the projection display apparatus constructed in such structure that a dichroic filter, which reflects and blocks the light in the wavelength band of 570 nm to 600 nm but transmits the visible light except for the aforementioned wavelength band to direct it toward the image display elements as illustrated in FIG. 42, is interposed in an optical path between the light source and the dichroic mirror DM1 and that this dichroic filter is allowed to be moved into or out of this optical path, so as to switch between a state without use of the light in the wavelength band of 570 nm to 600 nm and a state with use thereof. Without use of the wavelength band, display of color image can be presented with priority to color reproducibility, because the chromatic purity is high. With use of the wavelength band, display of color image can be presented with priority to brightness, because the total light quantity increases.

Incidentally, the projection display apparatus described in the above Japanese application is constructed to control the image display elements by a fixed control pattern regardless of presence or absence of the dichroic filter. For this reason, the color reproduction was unnatural and the quality of image was degraded considerably in color images in the case of the brightness-priority display (without the dichroic filter).

SUMMARY OF THE INVENTION

In view of the problems in the aforementioned conventional examples, an object of the present invention is to provide a display apparatus realizing less degradation of image quality than before.

The present invention presents a display apparatus comprising at least one display element, and an optical system for making a plurality of light beams of mutually different colors incident to the at least one display element, the display apparatus being arranged to form images of the respective colors by modulating the beams of the respective colors by the at least one display element, wherein purity of a predetermined color out of the colors is variable and wherein a control pattern of the display element is modified according to variation in the purity of the predetermined color.

A display apparatus according to one aspect of the present invention is a display apparatus for making a plurality of light beams of mutually different colors incident to at least one display element and modulating the beams of the respective colors by the at least one display element to form images of the respective colors, wherein purity of at least one color out of said colors is variable and wherein a control pattern of the image display element is modified according to variation in the purity of the at least one color.

In one aspect of the invention, when said purity is relatively low, an image of the at least one color is formed by using the light beam of the at least one color and the light beam of the color different from the at least one color.

In one aspect of the invention, the at least one color is red or green.

In one aspect of the invention, the at least one color is red or green and said color different of the at least one color is blue.

In one aspect of the invention, the purity of the at least one color is varied by moving a band cut filter or an edge filter into or out of an optical path of the at least one color.

In one aspect of the invention, the display apparatus comprises detection means for detecting a position of the filter, and the control pattern is modified, based on a signal from the detection means.

In one aspect of the invention, when the filter is off the optical path, an image of the at least one color is formed by using the light beam of the at least one color and the light beam of the color different from the at least one color.

In one aspect of the invention, the control pattern is modified so that a color reproduction range in the case of the purity of the color being relatively low becomes narrower than a color reproduction range in the case of the purity of the color being relatively high.

A color image display apparatus according to one aspect of the present invention is a color image display apparatus wherein purity of at least one color out of light of the three primary colors is variable and wherein when purity of said color is low, an image display element is controlled in a color reproduction range narrower than a color reproduction range used when the purity is high.

In one aspect of the invention, the display apparatus further comprises a projection optical system for projecting and superimposing the images of respective colors formed by said at least one display element onto a plane.

BRIEF DESCRIPTION OF THE DRAWINGS

FIG. 24 is a diagram to explain a control system according to the present invention;

FIG. 26 is a structural diagram of the fourth embodiment;

FIGS. 27A, 27B, and 27C are diagrams to show spectral reflectance characteristics of dichroic mirrors in the fourth embodiment;

FIG. 31 is a diagram to show a positional relation between light beams of the respective colors and pixels of the image display element in the fourth embodiment;

FIG. 32 is a structural diagram of the fifth embodiment;

FIG. 33 is a diagram to show wavelength spectral characteristics of a dichroic mirror in the fifth embodiment;

FIGS. 41A and 41B are diagrams to show the spectral transmittances of the dichroic mirrors in the conventional example;

FIG. 42 is a spectral distribution diagram of the detachable dichroic filter described in Japanese Patent Application Laid-Open No. 7-072450;

FIG. 49 is a diagram for explaining a configuration of signal processing in the image display apparatus;

FIG. 50 is a block diagram to show another configuration of signal processing in the image display apparatus;

DETAILED DESCRIPTION OF THE PREFERRED EMBODIMENTS

Embodiment 1

Figure 1:
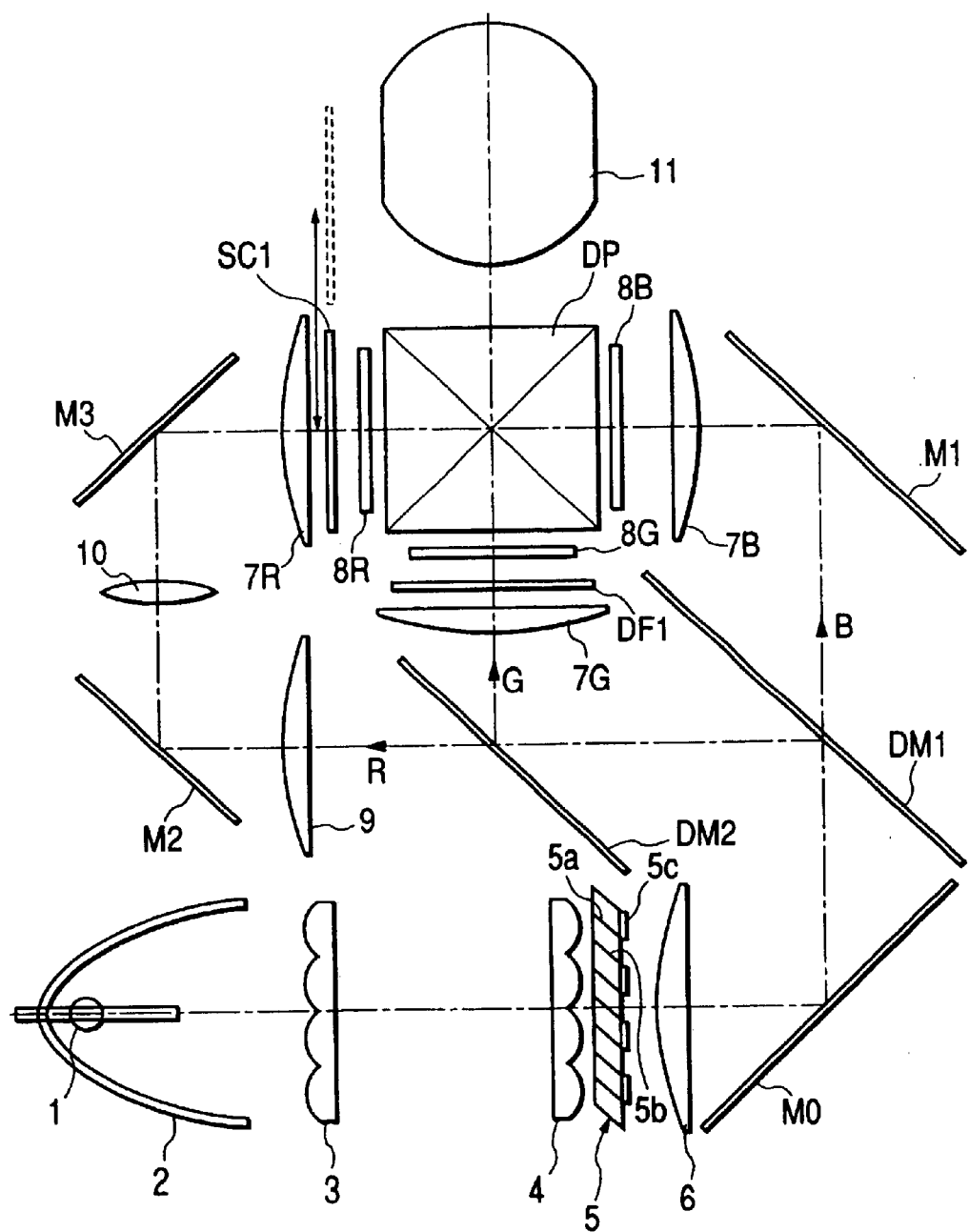
FIG. 1 is a diagram to show an optical layout of the first embodiment.

FIG. 1 shows the optical layout of the first embodiment of the projection display apparatus according to the present invention. In FIG. 1, reference numeral 1 designates a white light source, 2 a reflector, 3 a first fly's eye lens, 4 a second fly's eye lens, 5 a polarization converting element array consisting of a plurality of polarization separating films 5a, a plurality of reflective surfaces 5b, and a plurality of wave plates 5c, 6 a condenser lens, DM1 and DM2 dichroic mirrors, SC1 a color-selecting optical element which is detachably mounted, DF1 a dichroic filter, 7R, 7G, and 7B field lenses, 8R, 8G, and 8B known image display elements for red (R) image, for green (G) image, and for blue (B) image, respectively, DP a dichroic prism, and 11 a projection lens. The optical element SC1 is an element provided with a dichroic filter (interference film) or a color filter (light-absorbing film), which is mounted so as to be able to be moved into or out of the optical path of the red light. The fly's eye lenses 3, 4 are lens arrays consisting of lenses arranged two-dimensionally.

Figure 2A:
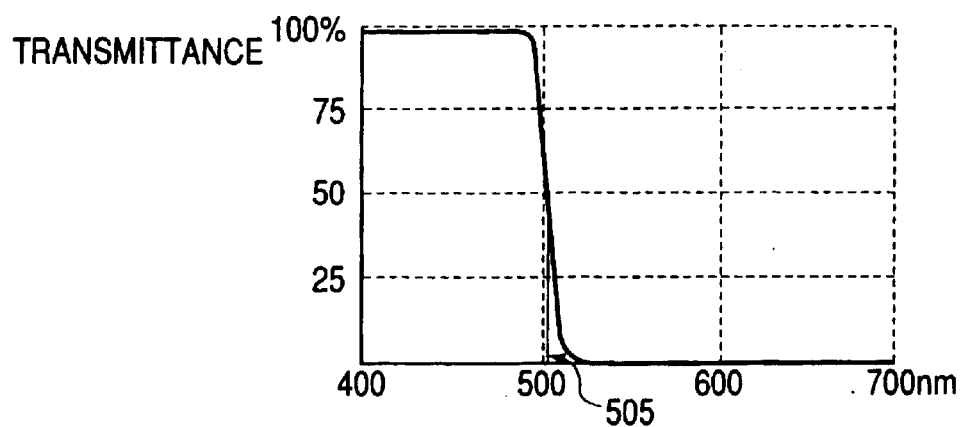
FIGS. 2A and 2B are diagrams to show spectral transmittances of optical elements in the first embodiment.
Figure 2B:
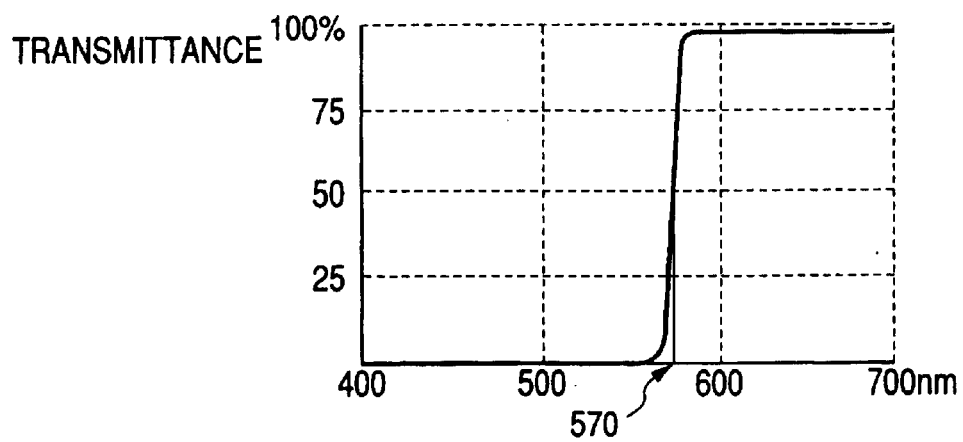
Figure 3:
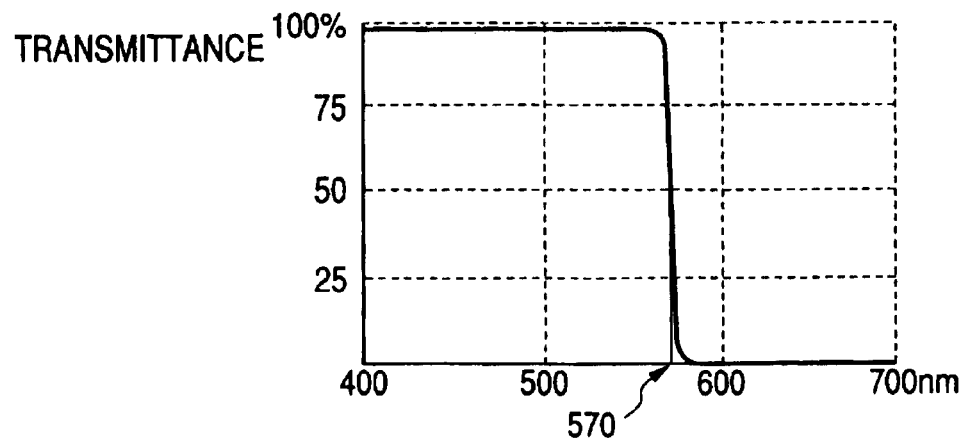
FIG. 3 is a diagram to show spectral transmittances of an optical element in the first embodiment.
Figure 4:
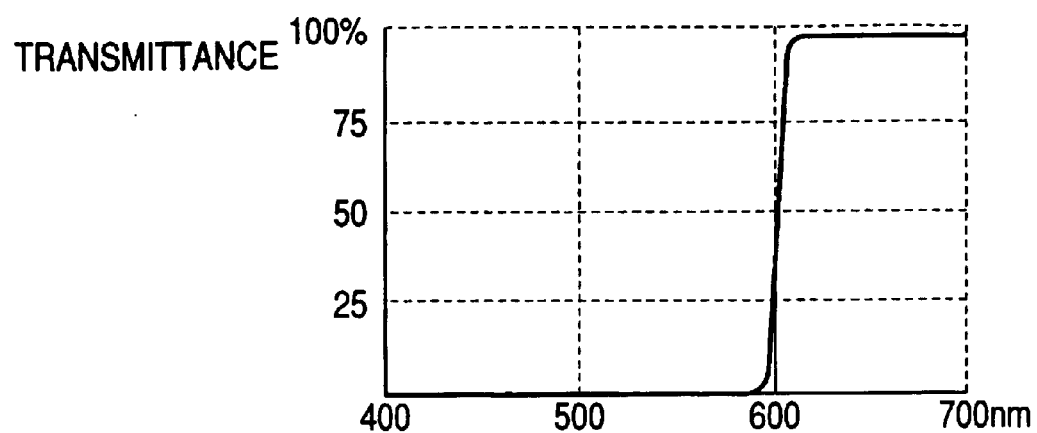
FIG. 4 is a diagram to show spectral transmittances of an optical element in the first embodiment.

The dichroic mirrors DM1, DM2 have their respective, spectral transmittance (reflectance) characteristics as illustrated in FIG. 2A and FIG. 2B and the dichroic filter DF1 and the color-selecting optical element SC1 have their respective spectral transmittance (reflectance) characteristics as illustrated in FIG. 3 and FIG. 4.

The action of the optical system of FIG. 1 will be described. White light emitted from the light source 1 is reflected and collected into parallel light by the reflector 2 to travel through the fly's eye lenses 3, 4, the polarization converting element array 5, and the condenser lens 6 and thereafter is separated into light beams of the three colors of R, G, and B by the dichroic mirrors DM1, DM2. Each beam travels through the field lens 7R, 7G, or 7B to be transmitted by the image display element 8R, 8G, or 8B. The color beams of R, G, and B are then combined into one by the dichroic prism DP and the composite light (image) of the three colors is magnified and projected onto a screen (not illustrated) or onto a wall (not illustrated) by the projection lens 11, whereby a magnified full-color image is formed thereon.

Figure 5:
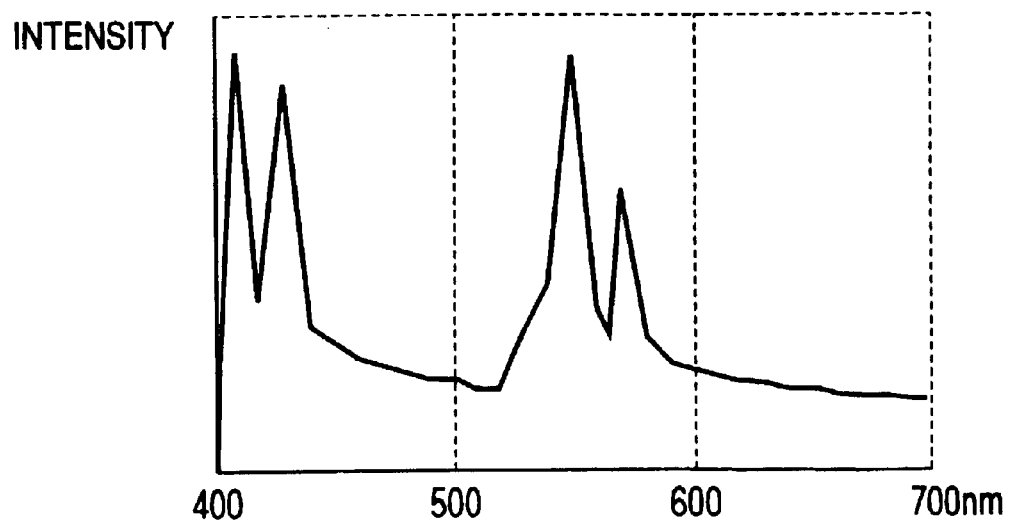
FIG. 5 is a diagram to show a spectral distribution of the light source.
Figure 6A:
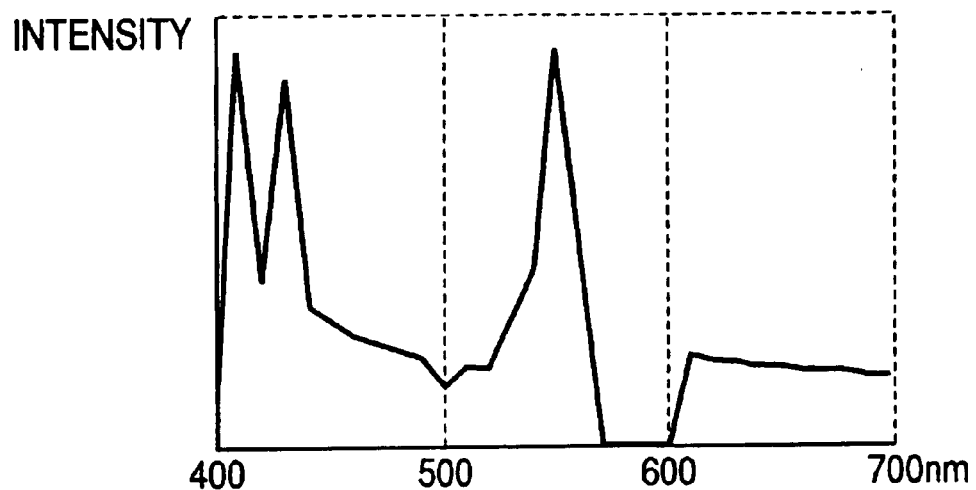
FIGS. 6A and 6B are diagrams to show spectral distributions after the composition of the colors.
Figure 6B:
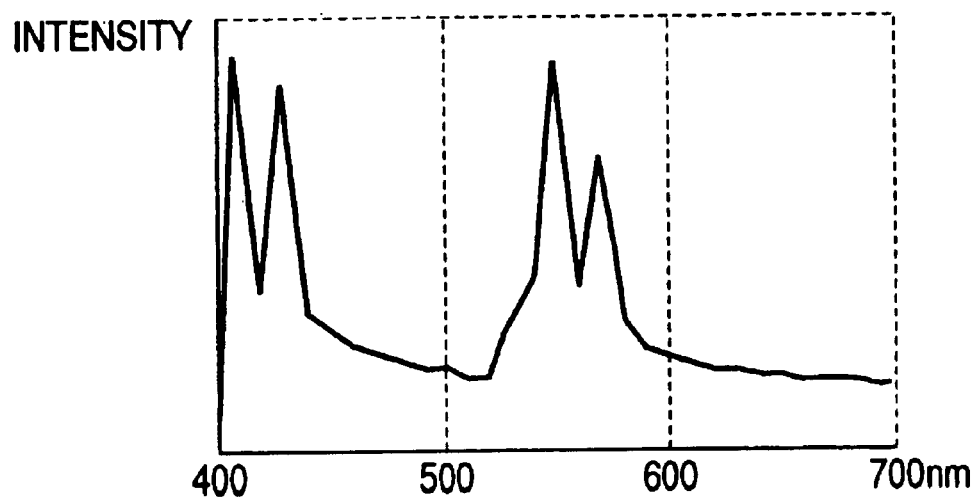

The light source 1 has the spectral characteristics illustrated in FIG. 5, similar to those in the conventional example, and the white light from the light source 1 is separated into the color component of blue (B) and the other color component at the border of the wavelength of 505 nm by the dichroic mirror DM1. The blue light is guided via the field lens 7B to the image display element 8B. The color component reflected by the dichroic mirror DM1 is separated into the color component of green and the other color component at the border of the wavelength of 570 nm by the dichroic mirror DM2 and the green light is guided via the field lens 7G and dichroic filter DF1 to the image display element 8G. The dichroic filter DF1 has such spectral characteristics as illustrated in FIG. 3 to remove some wavelength components in order to correct for light intensity unevenness due to incident angle dependency concerning the color separation of the dichroic mirror DM2 to make the light intensity distribution uniform on the image display element 8G. The color beam transmitted by the dichroic mirror DM2 travels via the condenser lens 9, mirror M2, relay lens 10, and mirror M3 to enter the color-selecting optical element SC1. The spectral transmittances of this element SC1 have such characteristics as to transmit wavelengths longer than 600 nm but intercept the wavelengths shorter than it, as illustrated in FIG. 4. Because of the characteristics, in the case of high chromatic purity wherein the color-selecting optical element SC1 is present in the optical path, the wavelength band of red is not less than 600 nm, and in the case of low chromatic purity wherein the color-selecting optical element SC1 is present outside the optical path, the wavelength band of red is not less than 570 nm. FIG. 6A shows a spectral distribution of the light after the color composition by the dichroic prism DP in the case wherein the color-selecting optical element SC1 is in the optical path, and FIG. 6B a spectral distribution of the light after the color composition by the dichroic prism DP in the case wherein the color-selecting optical element SC1 is off the optical path. Here the color-selecting optical element SC1 may be a dichroic filter that transmits the wavelengths above 600 nm but reflects the wavelengths below 600 nm, or a color filter that transmits the wavelengths above 600 nm but absorbs the wavelengths below 600 nm, or may also be a combination of the dichroic filter with the color filter. Similar effect can also be achieved by interposing the color-selecting optical element SC1 anywhere between the dichroic mirror DM2 and the color display element 8R or between the element 8R and the prism DP.

The dichroic filter may be either a band-pass filter or an edge filter.

Figure 7:
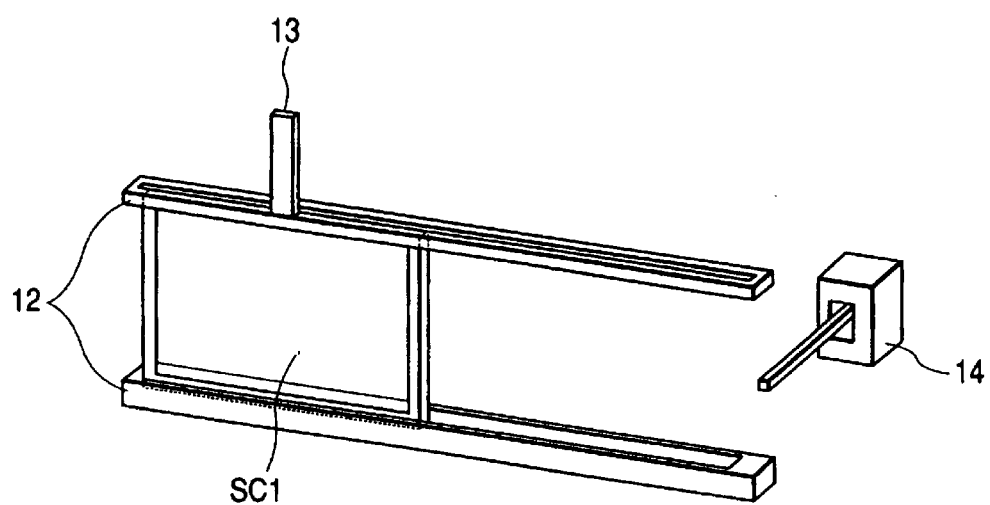
FIG. 7 is a diagram to explain a retaining structure.
Figure 8:
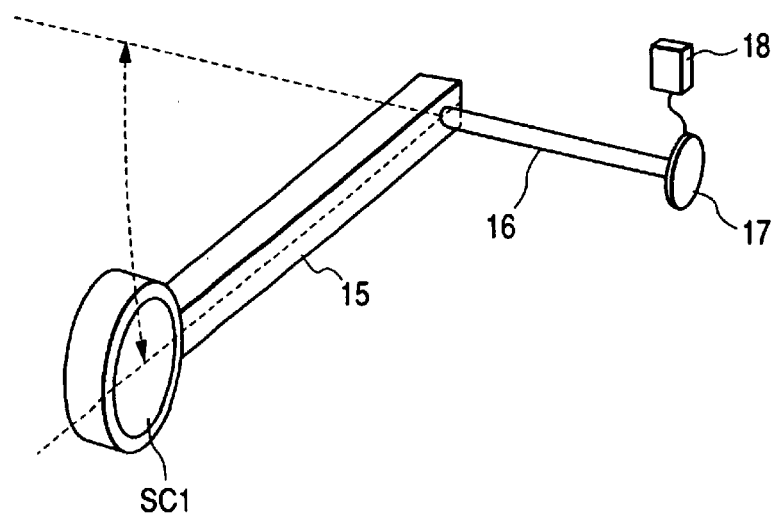
FIG. 8 is a diagram to explain another retaining structure.

FIG. 7 shows an example of a retaining structure for retaining the color-selecting optical element SC1 in the first embodiment. In the example of FIG. 7 the color-selecting optical element SC1 is fixed to a slidable guide 12 and a user is allowed to move the color-selecting optical element SC1 into or out of the optical path by sliding a knob 13 from the outside of the apparatus. The apparatus is further provided with a switch 14 so as to be able to electrically detect whether the color-selecting optical element SC1 is in the optical path. As another structure, the color-selecting optical element SC1 is fixed to the slidable guide 12, the color-selecting optical element SC1 is arranged so as to be movable together with the guide by means of an actuator (not illustrated), the user is allowed to move the color-selecting optical element SC1 into or out of the optical path by changeover of an electric switch, and whether the color-selecting optical element SC1 is in the optical path is electrically detected by detecting a state (on or off) of the electric switch. As still another structure, as illustrated in FIG. 8, one end of a member 15 holding the color-selecting optical element SC1 is rotatable about the rotation center, the user is allowed to rotate a rotation shaft 16 by a knob 17 or the like in order to move the color-selecting optical element SC1 into or out of the optical path, and, for example, a detector for detecting the position of the knob 17 is provided to detect presence or absence of the element SC1 in the optical path.

Figure 9:
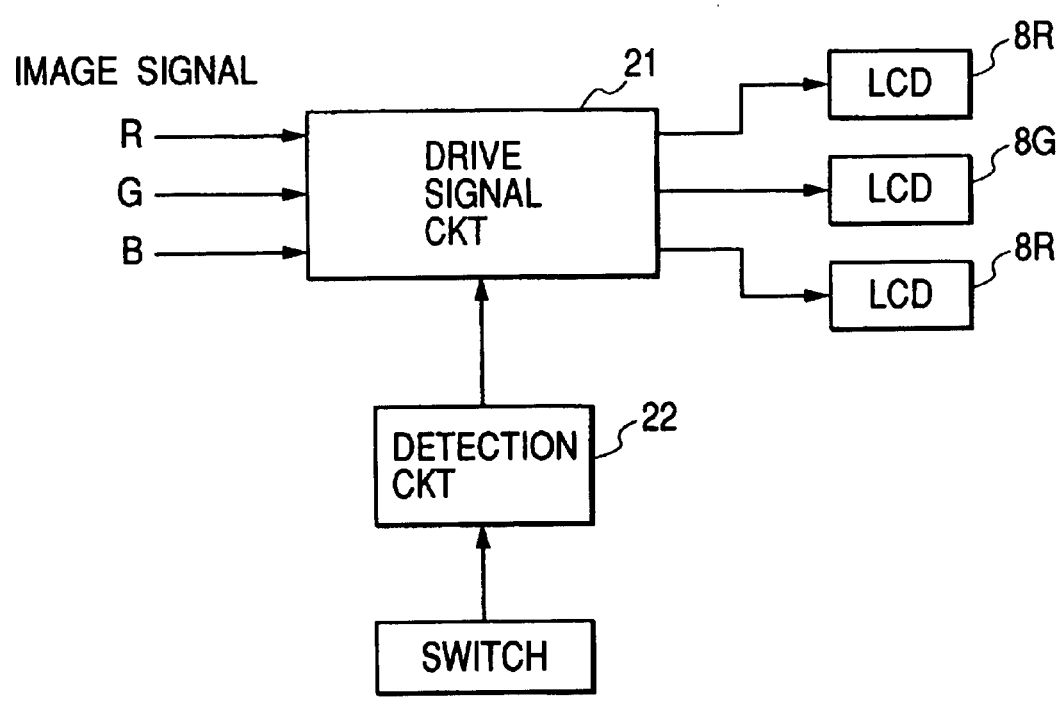
FIG. 9 is a diagram to show a configuration of a control system in the first embodiment.
Figure 10:
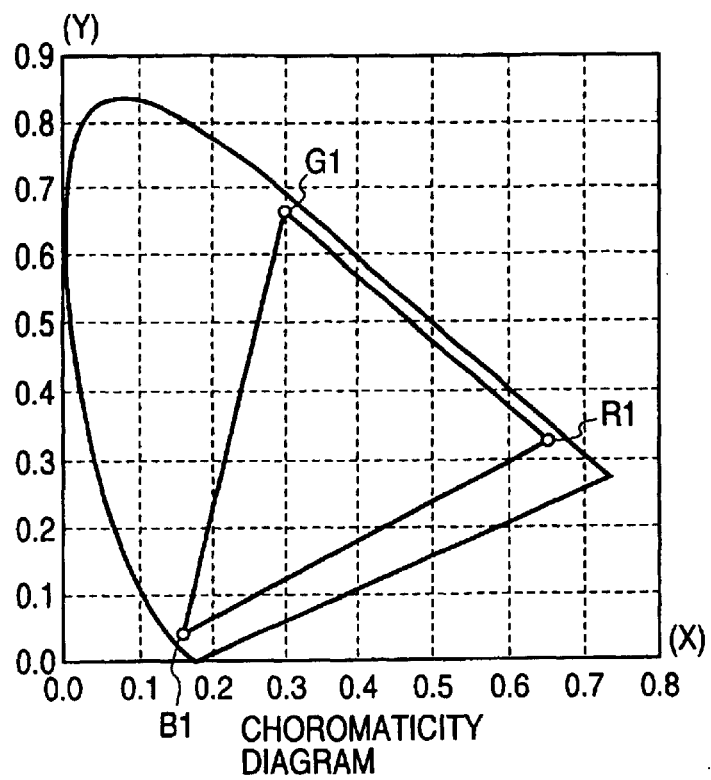
FIG. 10 is a diagram to explain the color reproduction area in the first embodiment.
Figure 11:
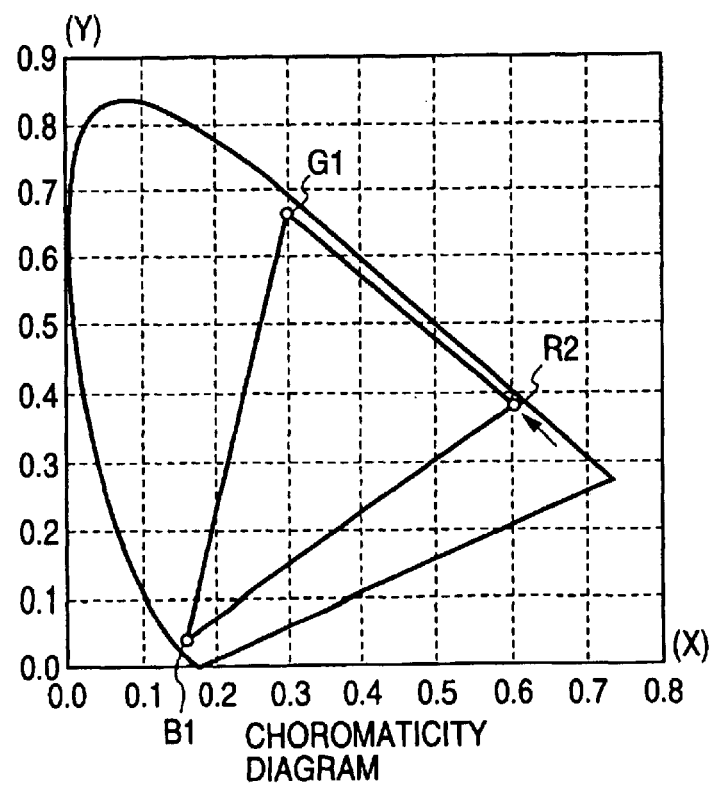
FIG. 11 is a diagram to explain the color reproduction area in the first embodiment.
Figure 12:
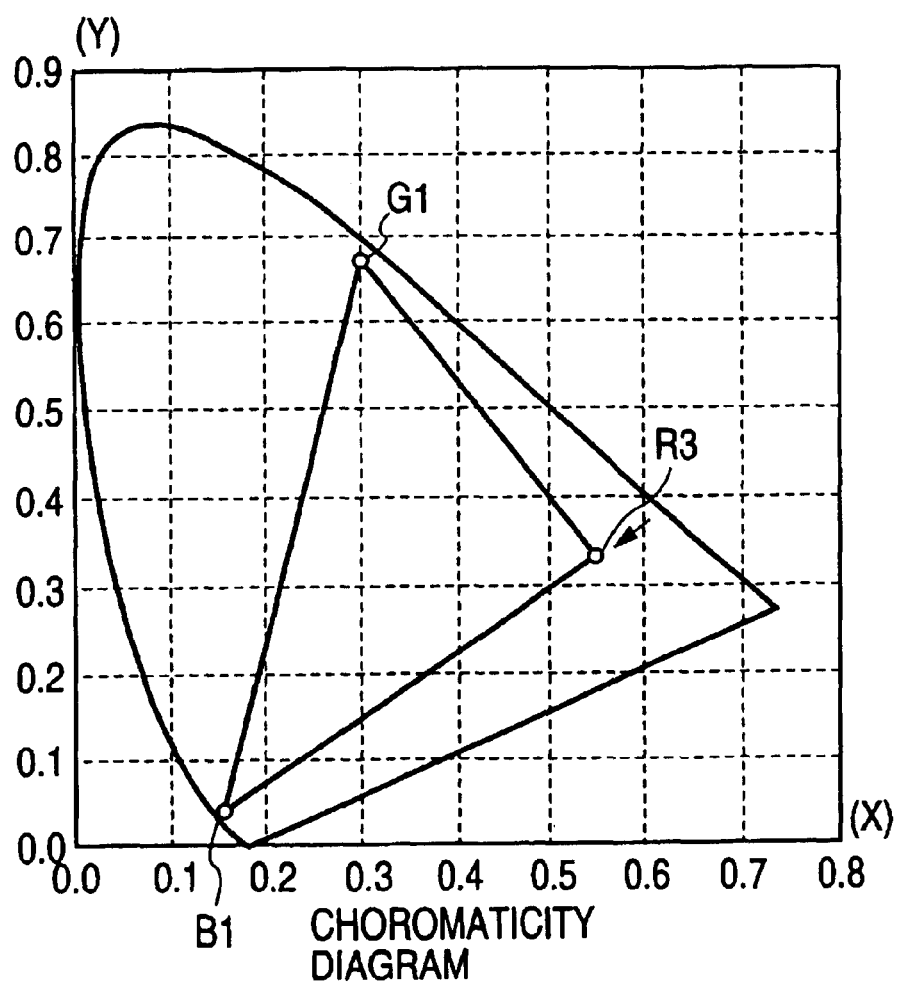
FIG. 12 is a diagram to explain the color reproduction area in the first embodiment.

FIG. 9 is a structural diagram of a control circuit for display of images in the image display elements in the first embodiment. As illustrated in FIG. 9, this control circuit is comprised of a drive signal circuit 21 for generating drive signals for driving the respective image display elements of R, G, and B, based on image signals of R, G, and B supplied from the outside, and a detection circuit 22 for detecting whether the color-selecting optical element SC1 is in the optical path and for generating a detection signal. Based on the detection signal from the detection circuit 22, the circuit 21 generates such normal drive signals as to drive each of the image display elements of R, G, and B according to the image signals of R, G, and B when the color-selecting optical element SC1 is in the optical path, and the circuit 21 generates such drive signals as to add a predetermined amount of blue light to display of the single color of red, different from the normal drive signals, when the color-selecting optical element SC1 is off the optical path. The color reproduction at this time will be described referring to FIGS. 10, 11, and 12. When the color-selecting optical element SC1 is in the optical path, the color reproduction area is an area of a triangle (R1, G1, B1) illustrated in FIG. 10, wherein the color reproduction with high purity can be made at each single color of R, G, and B and wherein the image display can be implemented with priority to color reproducibility. When the color-selecting optical element SC1 is set outside the optical path in order to give priority to brightness of the image display, the light of 570 nm to 600 nm is added to the optical path of R and thus the color reproduction area is a triangle (R2, G1, B1) in which the red reproduction area is shifted toward green as indicated by an arrow in FIG. 11. At this time, if the driving of each display element of red and green is controlled so as to add blue light to red light in the display of the red color, the red reproduction area R2 illustrated in FIG. 11 will be shifted toward blue, forming a triangle (R3, G1, B1) as illustrated in FIG. 12. By this shift of the color reproduction area toward blue, more natural color reproduction than before can be implemented in the image display with priority to brightness under the addition of the light of 570 nm to 600 nm.

In the present embodiment the wavelength band that can be selected by the color-selecting optical element SC1 is 570 nm to 600 nm, but, without having to be limited to this, the wavelength band used for the changeover of purity can be determined depending upon setting conditions of color reproduction of R and G in the image display with priority to color reproducibility, where the purity-variable color is red or green. The shortest wavelength can be selected in the range of 550 nm to 585 nm and the longest wavelength in the range of 590 nm to 610 nm.

Embodiment 2

Figure 13:
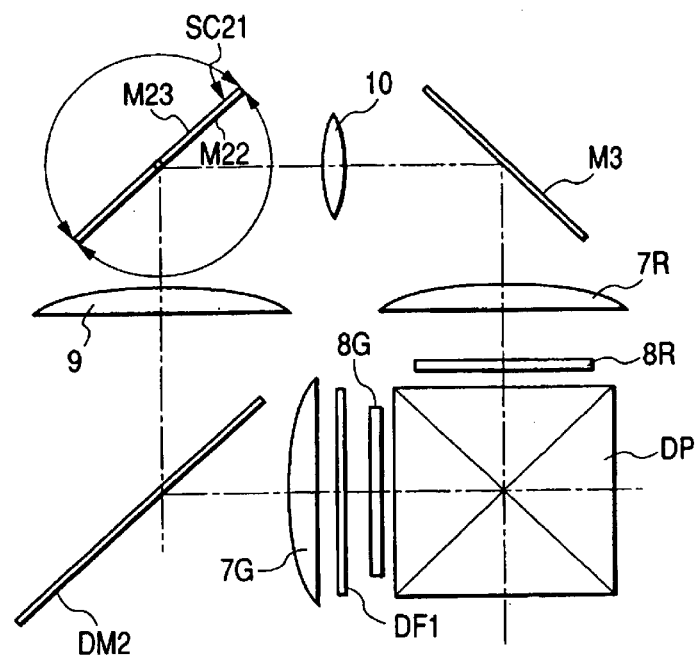
FIG. 13 is a diagram to show the second embodiment.

FIG. 13 shows the second embodiment of the present invention. For simplicity of description, the same members as in the first embodiment described above will be denoted by the same reference symbols as in FIG. 1 and only different points from the first embodiment will be described with omitting the description of the same members.

Figure 14:
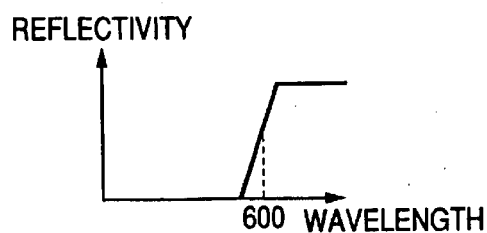
FIG. 14 is a diagram to show the second embodiment.
Figure 15A:
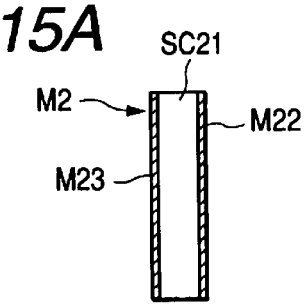
FIGS. 15A and 15B are diagrams to show the second embodiment.
Figure 15B:
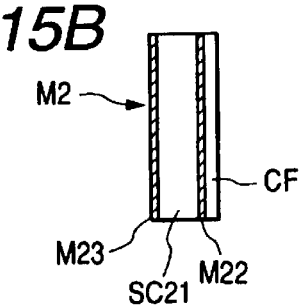

In the first embodiment the color-selecting optical element SC1 was structured so as to be moved into or out of the optical path by translational movement, whereas in the second embodiment illustrated in FIG. 13 the color-selecting optical element SC21 is constructed as follows; it has a first reflective surface M22 and a second reflective surface M23 formed on the both surfaces of a substrate, the first reflective surface M22 has such spectral reflectance characteristics as illustrated in FIG. 14 in order to be used as a color-selecting element, the second reflective surface M23 has such reflection characteristics as to reflect all the color light incident thereto, and the element SC21 is rotated about the rotation axis perpendicular to the optical axis to switch between the first reflective surface M22 and the second reflective surface M23 with respect to the incident light, whereby the first reflective surface M22 can be moved into or out of the optical path, as a color-selecting element. The structure of this optical element SC21 may be one wherein the first reflective surface M22 is a red-reflecting dichroic mirror, the second reflective surface M23 is a white-reflecting mirror, and the two reflective surfaces M22, M23 are formed on the front and back surfaces of a plane-parallel plate, as illustrated in FIG. 15A. Another structure may also be such that each of the front and back surfaces of a plane-parallel plate is a white-reflecting mirror, a color filter of the absorption type having the characteristics of FIG. 4 is attached to the surface expected to act as the first reflective surface M22, and the surface expected to act as the second reflective surface M23 is used as it is, as illustrated in FIG. 15B. Another structure may be constructed in such a manner that the first reflective surface and the second reflective surface M22, M23 are produced on mutually different substrates and they are combined to form a single optical element. In still another structure, the separate elements may be arranged to be inserted alternately into the optical path.

Embodiment 3

Figure 16:
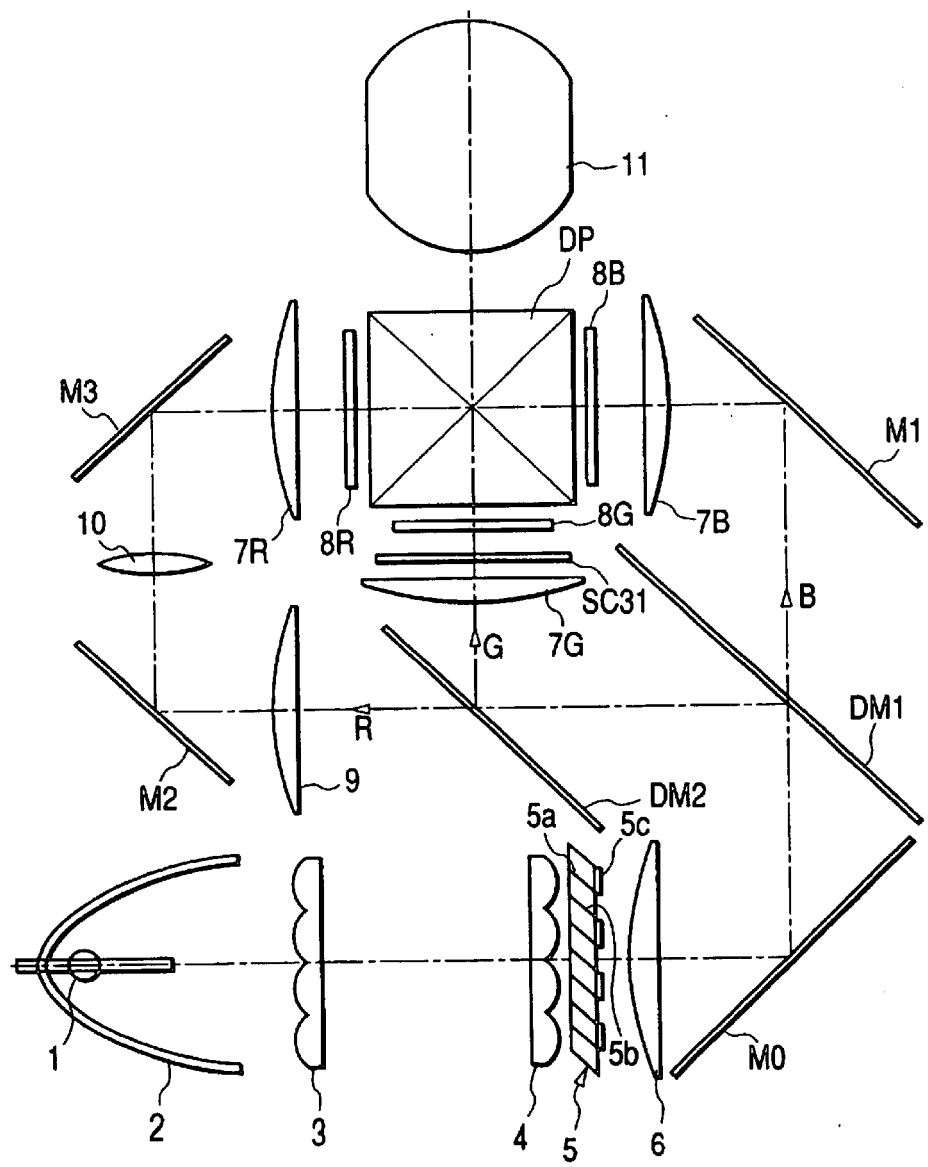
FIG. 16 is a diagram to show the third embodiment according to the present invention.

FIG. 16 shows the optical layout of the third embodiment of the projection display apparatus according to the present invention. In the first and second embodiments described above the color-selecting optical element was moved onto or out of the optical path of the red light, whereas in this Embodiment 3 the dichroic filter DF1, which was in the optical path of the green light, is replaced by a detachable color-selecting optical element SC31 instead to make the purity of green variable. The structure except for the above is similar to the first embodiment described above.

Figure 17:
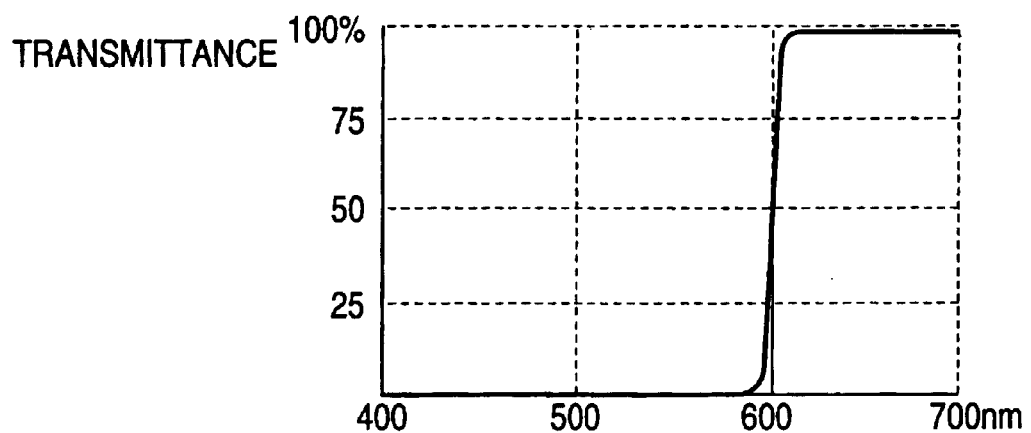
FIG. 17 is a diagram to show spectral transmittances of an optical element in the third embodiment.
Figure 18:
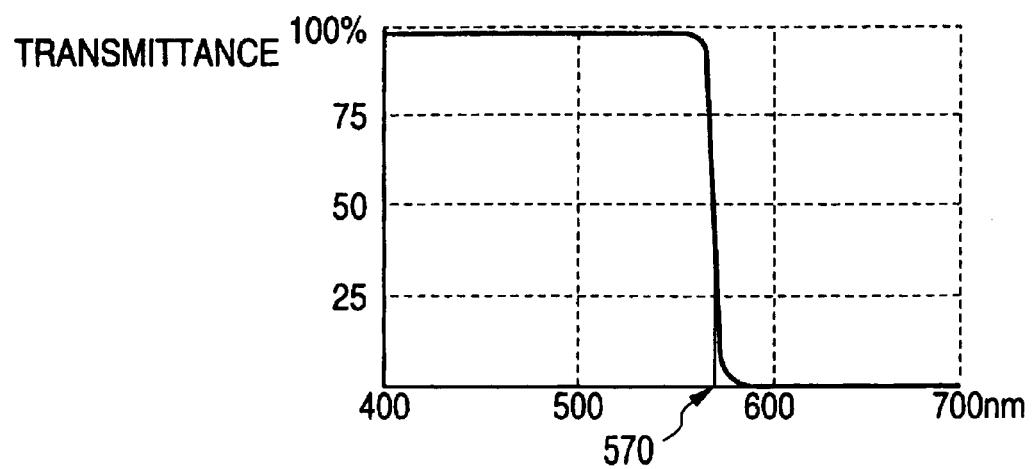
FIG. 18 is a diagram to show spectral transmittances of an optical element in the third embodiment.

The spectral characteristics of the light source 1 are the same as the spectral characteristics of the light source 1 in the first embodiment (see FIG. 5). The spectral transmittance characteristics of the dichroic mirror DM1 are also the same as those of the mirror DM1 in the first embodiment. FIG. 17 shows the spectral transmittances of the dichroic mirror DM2 in the third embodiment and FIG. 18 shows the spectral transmittances of the color-selecting optical element SC31 in the third embodiment.

The action of the optical system of FIG. 16 will be explained. The white light emitted from the light source 1 is reflected and collected into parallel light by the reflector 2 and then travels through the fly's eye lens arrays 3, 4, the polarization converting element array 5, and the condenser lens 6. Thereafter, it is separated into the color beams of R, G, and B by the dichroic mirrors DM1, DM2. Each color beam travels through the field lens 7R, 7G, or 7B to be transmitted by the image display element 8R, 8G, or 8B. The color beams of R, G, and B are combined into one by the dichroic prism DP and the composite light (image) of the three colors is enlarged and projected onto the screen (not illustrated) or onto the wall (not illustrated) by the projection lens 11, whereby an enlarged full-color image is formed thereon.

The white light from the light source 1 is separated into the color component of blue (B) and the other color component at the border of the wavelength of 505 nm by the dichroic mirror DM1, and the blue light is guided via the field lens 7B to the image display element 8B. The color light reflected by the dichroic mirror DM1 is separated into the red light and the other color light at the border of the wavelength of 600 nm by the dichroic mirror DM2, and the red light is guided via the condenser lens 9, the mirror M2, the relay lens 10, and the mirror M3 to the image display element 8R. The color light reflected by the dichroic mirror DM2 is incident to the color-selecting optical element SC31. The color-selecting optical element SC31 has such spectral transmittance characteristics, as illustrated in FIG. 18, as to transmit the wavelengths shorter than 570 nm but intercept the wavelengths longer than it. Because of these characteristics, the wavelength band of green ranges from 505 nm to 570 nm when the color-selecting optical element SC31 is present in the optical path, but the wavelength band of green ranges from 505 nm to 600 nm when the color-selecting optical element SC31 is present outside the optical path. In this case, the color-selecting optical element SC31 is arranged to be moved in directions normal to the plane of the drawing, the moving mechanism of FIG. 7 or FIG. 8 is employed, and whether the color-selecting optical element SC31 is in the optical path can be electrically detected by the detector 14 or 18, as in Embodiment 1.

Figure 19:
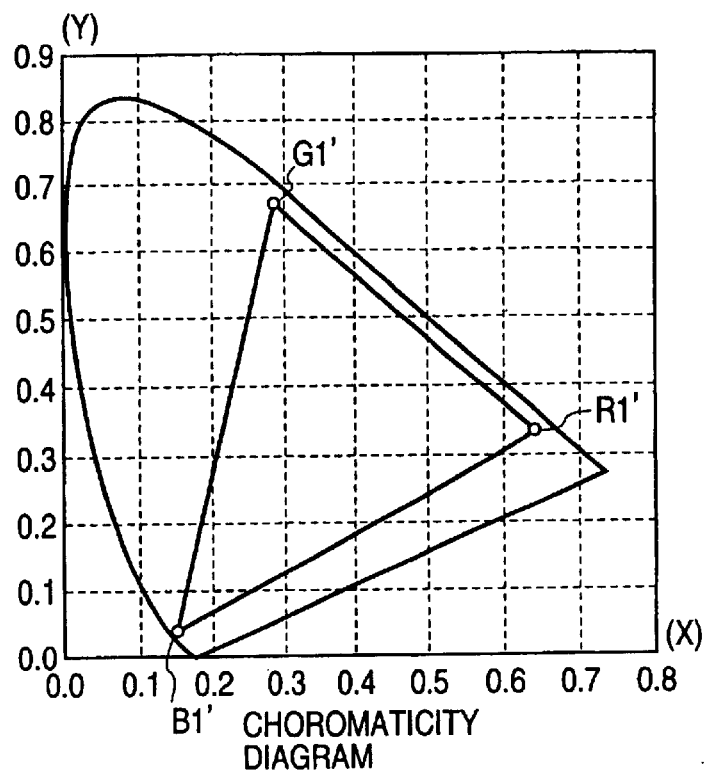
FIG. 19 is a diagram to explain the color reproduction area in the third embodiment.
Figure 20:
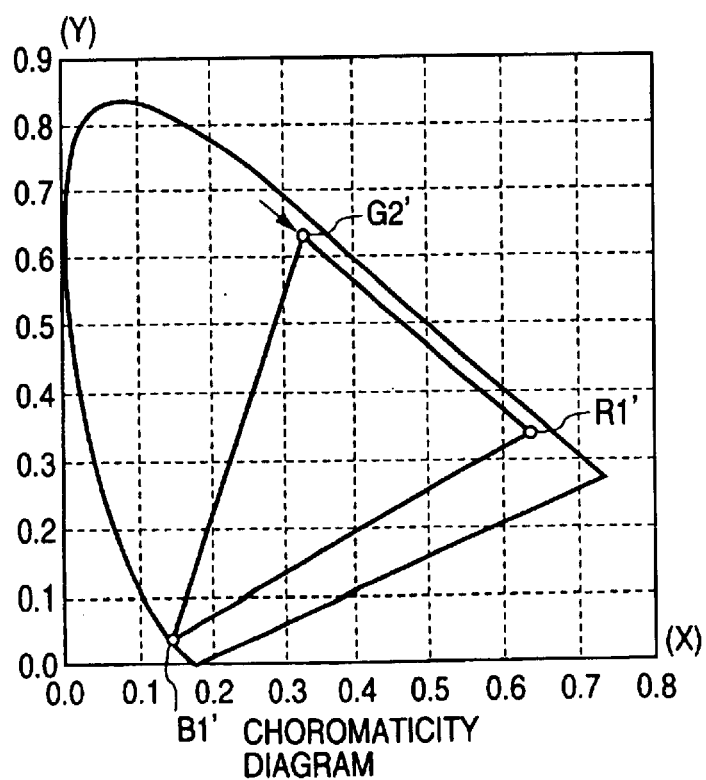
FIG. 20 is a diagram to explain the color reproduction area in the third embodiment.
Figure 21:
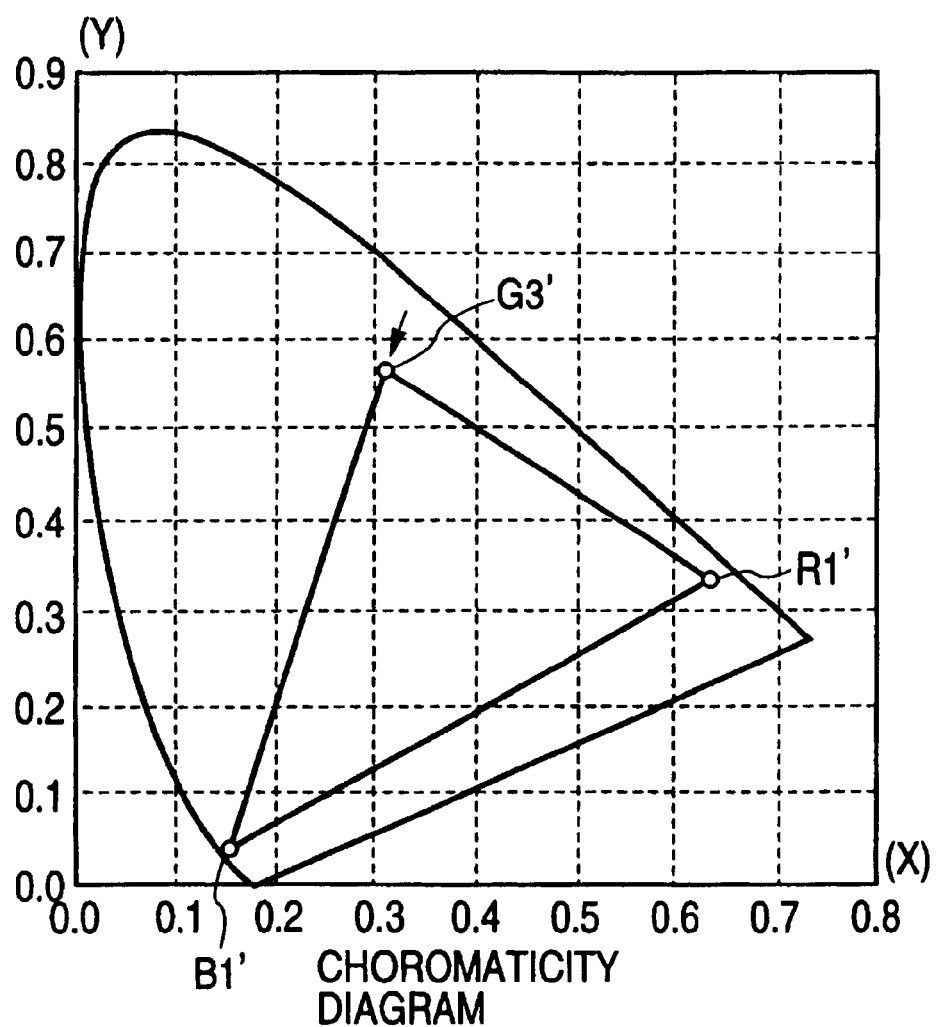
FIG. 21 is a diagram to explain the color reproduction area in the third embodiment.

The basic layout of the control circuit for display of the images in the image display elements 8R, 8G, 8B is similar to the circuit of FIG. 9 presented in Embodiment 1, but the drive signal circuit 21 herein is arranged, based on the detection signal from the detection circuit 22, to generate the normal drive signals to drive each of the image display elements of R, G, and B according to the image signals of R, G, and B when the color-selecting optical element SC31 is in the optical path and to generate the drive signals to add a predetermined amount of blue light to the green light in display of the single color of green when the color-selecting optical element SC31 is off the optical path. The color reproduction at this time will be described referring to FIGS. 19, 20, and 21. When the color-selecting optical element SC31 is in the optical path, the color reproduction area is a region of a triangle (R1', G1', B1') illustrated in FIG. 19, wherein color reproduction with high purity can be implemented in each single color of R, G, and B and wherein the image display can be made with priority to color reproducibility. When the color-selecting optical element SC31 is set outside the optical path in order to perform the image display with priority to brightness, the light of 570 nm to 600 nm is added to the light of G and thus the color reproduction area is a triangle region (R1', G2', B1') wherein the reproduction area of green is shifted toward red as indicated by an arrow in FIG. 20. At this time, if each display element of green and blue is driven so as to add the blue light to the green light in the display of green the green reproduction area G2 illustrated in FIG. 20 will be shifted toward blue to form a triangle (R1', G3', B1') as illustrated in FIG. 21. This shift of the color reproduction area toward blue also allows more natural color reproduction to be implemented in the color display with priority to brightness under the addition of the light of 570 nm to 600 nm.

Figure 22:
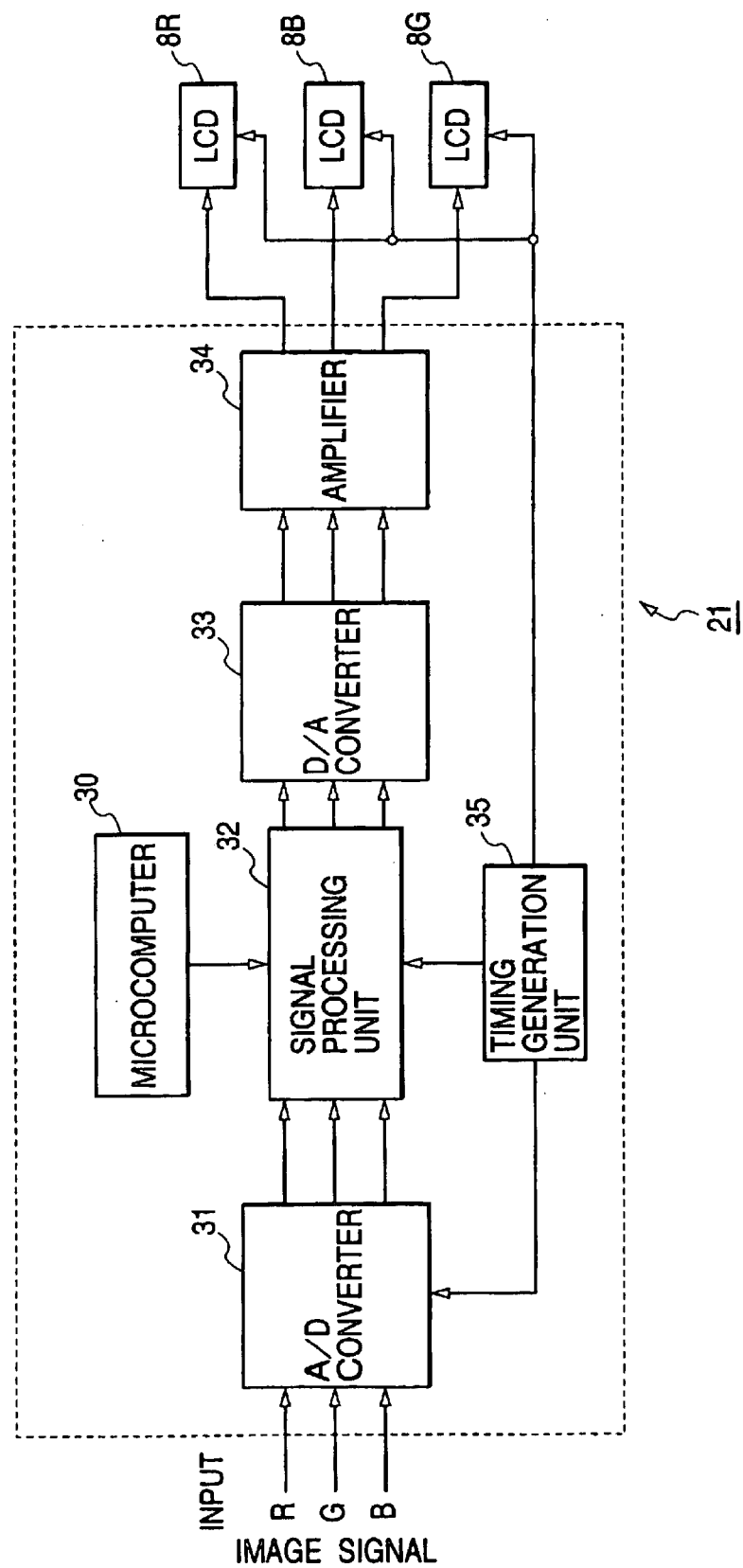
FIG. 22 is a diagram to explain a control system according to the present invention.

Described below is a specific signal processing method of the drive signal circuit 21 employed when the color-selecting optical element is off the optical path in Embodiment 1. FIG. 22 shows the detailed structure of this circuit. The image signals of R, G, and B entered at respective input terminals (INPUT), which are analog signals, are converted into digital signals by A/D converter 31, and the digital signals are subjected to signal processing and image processing such as gamma correction and contrast enhancement by signal processing unit 32. Then the signals are converted again to analog signals by D/A converter 33 and the analog signals after the D/A conversion are amplified by amplifier 34. The signals thus amplified are entered into the respective image display elements to drive pixels of the image display elements 8R, 8G, 8B. These sequential processes are controlled based on synchronous signals generated by timing generation unit 35. Only when receiving a signal indicating that the color-selecting optical element SC1 is off the optical path, from the detection circuit 22, the signal processing unit adds a process of converting the signals of B according to a conversion table preset based on color information designated by the input signals of R, G, and B, whereby the aforementioned conversion of the color reproduction area can be implemented. For example, supposing the digital signals in the signal processing unit are 8-bit signals, the conversion table for converting the color reproduction area of red to the blue-side region can be produced so as to effect the following conversion, where coordinates of colors are expressed by a coordinate system of (R, G, B).

red (255, 0, 0)→(255, 0, 25)

yellow (255, 255, 0)→(255, 255, 12)

blue (0, 0, 255)→(0, 0, 255)

Figure 23:
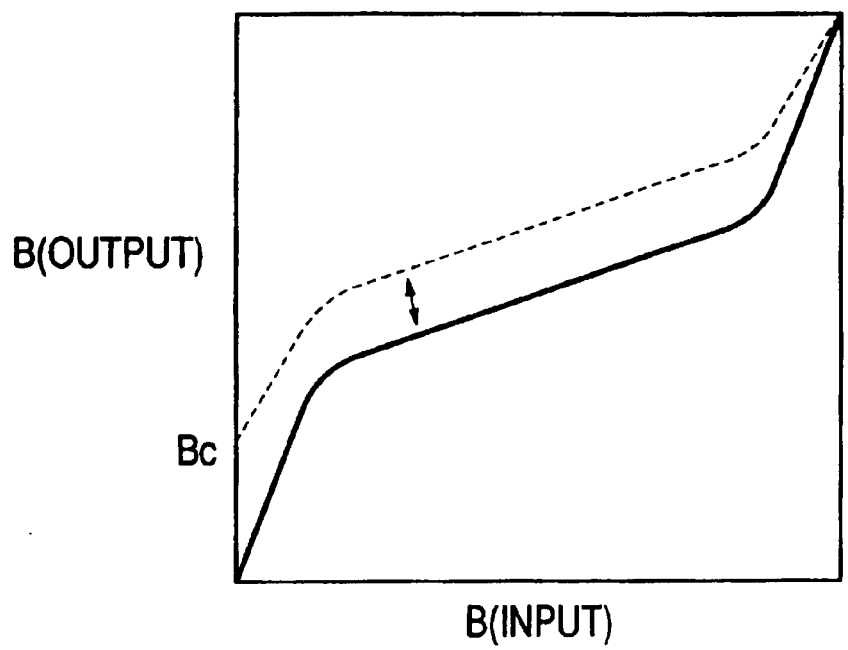
FIG. 23 is a diagram to explain the control system according to the present invention.

Unlike this, similar effect can also be expected by preparing two tables of gamma conversion for B having mutually different contents and switching between the tables in gamma conversion for conversion from the input signals to the output signals between when the color-selecting optical element SC1 is in the optical path and when it is off the optical path. FIG. 23 shows an example of such gamma tables. In this figure the solid line indicates a table used when the color-selecting optical element SC31 is in the optical path and the dashed line indicates a table used when the color-selecting optical element SC31 is off the optical path. According to this, the output of predetermined amount (Bc) is always present in the output signal of B with the element outside the optical path to convert the color reproduction area of red. It is, however, noted that the color reproduction area of green is also converted at this time.

Figure 25:
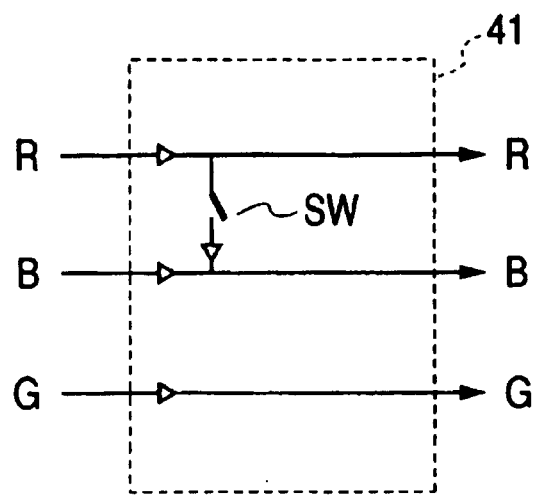
FIG. 25 is a diagram to explain the control system according to the present invention.

As a method for carrying out this conversion before entry into the signal processing unit, as illustrated in FIG. 24, the input signals may be first subjected to the conversion of the reproduction area in a signal synthesizing unit 41, followed by A/D conversion and signal processing. FIG. 25 shows the detailed structure of the signal synthesizing unit 41. As illustrated in FIG. 25, the signal of R flows via a switch SW to the signal of B, the switch is made on with the color-selecting element outside the optical path to combined the input signal (BIN) of B with the input signal of R (RIN), as described below, to effect the composition of the input signals, thereby converting the color reproduction area. In the equation k is an appropriate constant.

(BIN)'=(BIN)+k(RIN)

Embodiment 4

The examples using a plurality of image display elements have been described heretofore, but the present invention can also be applied to cases of full-color display with a single image display element, without having to be limited to the cases of plural display elements. An example will be described as the fourth embodiment of the present invention. FIG. 26 shows the structure of the projection display apparatus according to the fourth embodiment, FIGS. 27A to 27C show the spectral reflectances of dichroic mirrors DM3 to DM5 illustrated in FIG. 26, and FIG. 28 the spectral reflectances of the color-selecting optical element SC41.

Figure 29:
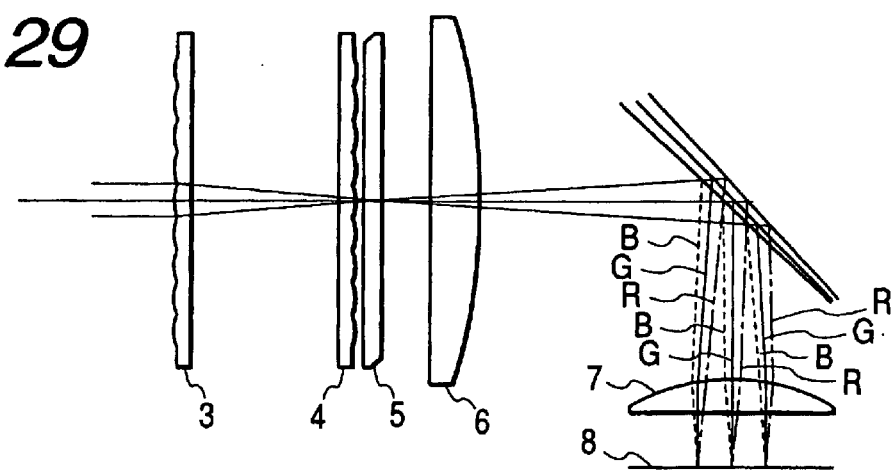
FIG. 29 is a schematic diagram to show optical paths in the fourth embodiment.
Figure 30:
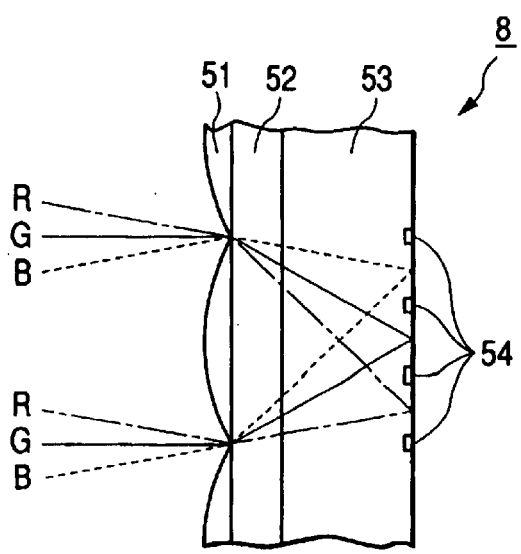
FIG. 30 is a diagram to show the internal structure and optical paths of the image display element in the fourth embodiment.

FIG. 29 and FIG. 30 are schematic diagrams to show the optical paths of the respective color beams in Embodiment 4 and to show the internal structure of the image display element 8 and the optical paths of the respective color beams, respectively. The white light is separated into the blue, green, and red light beams by the three dichroic mirrors showing the spectral reflectances as illustrated in FIGS. 27A, 27B, and 27C, and these blue, green, and red light beams are made incident at mutually different angles of incidence to a microlens array provided on the light source 1 side of the image display element 8. In a liquid crystal layer of the image display element 8 each pixel (picture element) is divided into three color pixels corresponding to the blue, green, and red beams as illustrated in FIG. 31, and they are driven independent of each other. The blue, green, and red beams travel through the microlens array and thereafter illuminate the respective color pixels separately.

Figure 28:
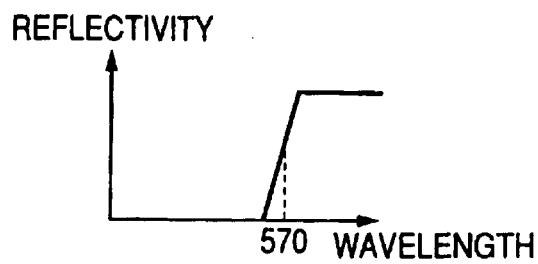
FIG. 28 is a diagram to show spectral reflectance characteristics of a dichroic mirror in the fourth embodiment.

By moving the color-selecting optical element SC41 having the spectral reflectance characteristics of FIG. 28 into or out of the optical path, the single apparatus can switch between the display state with priority to color reproducibility and the display state with priority to brightness.

The dichroic mirror DM5 and the color-selecting optical element SC41 are located at different positions but in parallel to each other. Therefore, an angle of incidence of the purity-variable red light to the microlens array inside the image display element 8 after reflection at the mirror DM5 is equal to an angle of incidence of the red light to the microlens array after reflection at the element SC41. In the both cases the red light is incident to the color pixels corresponding thereto.

When the color-selecting optical element SC41 having the spectral reflectance characteristics of FIG. 28 is present in the optical path, the display is in the state with priority to brightness in which the wavelength band of 570 nm to 600 nm is added to the color light of red (R). When this element SC41 is present outside the optical path, the display is in the state with priority to color reproducibility in which the wavelength band of 570 nm to 600 nm is not used for the red light.

In the case of this Embodiment 4, the color-selecting optical element SC41 does not have to be limited to the use of the dichroic mirror, but a mirror that reflects the whole band of visible light may also be used as the element SC41.

The apparatus is constructed in such structure that the movement of the color-selecting optical element SC41 into or out of the optical path is carried out in the directions of arrows in the figure by the mechanism illustrated in FIG. 7 and that whether the color-selecting optical element SC41 is in the optical path can be electrically detected by the detector 14 or 18, similar to Embodiment 1.

Since the structure of the control circuit and the driving method for displaying the images of the respective colors by the image display element are similar to those in Embodiment 1, Embodiment 4 can also achieve the same effect as Embodiment 1. It is, however, needless to mention that the objects controlled by the control circuit of FIG. 9 used in Embodiment 1 are not the three LCDs (liquid crystal display elements) but the three color (R, G, B) pixel groups of one LCD (liquid crystal display element).

In the description of Embodiment 4, the members 1, 2, 3, 4, 5, 6, 7, 8, and 10 in FIG. 26 and FIG. 29, which are omitted from the description, are the same members as those denoted by the same numerals in FIG. 1.

Embodiment 5

In the fourth embodiment described above the color beam of red had the variable wavelength band by moving the color-selecting optical element SC41 into or out of the optical path in order to make the purity of red variable, but the wavelength band of the green beam can also be made variable by modifying the arrangement of the dichroic mirrors and the spectral characteristics of the color-selecting optical element in the fourth embodiment. This will be explained as the fifth embodiment of the present invention. FIG. 32 is a diagram to show the structure of the projection display apparatus according to the fifth embodiment and FIG. 33 shows the spectral reflectance characteristics of the color-selecting optical element SC51.

Figure 34:
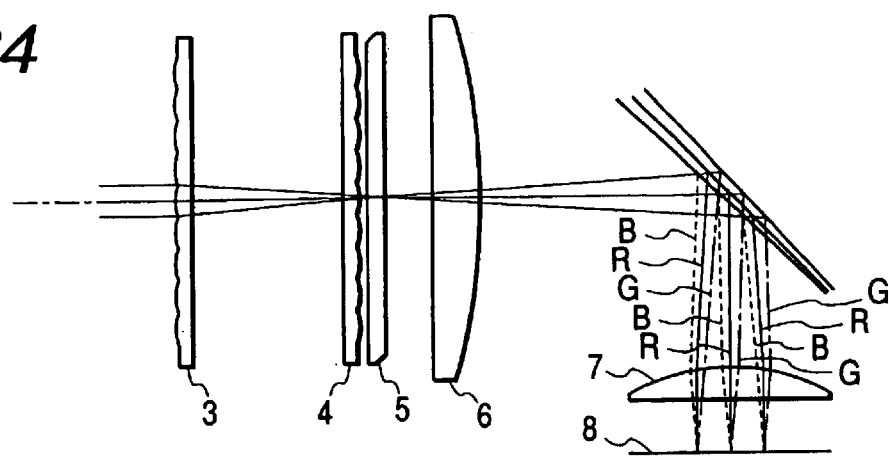
FIG. 34 is a schematic diagram to show optical paths in the fifth embodiment.
Figure 35:
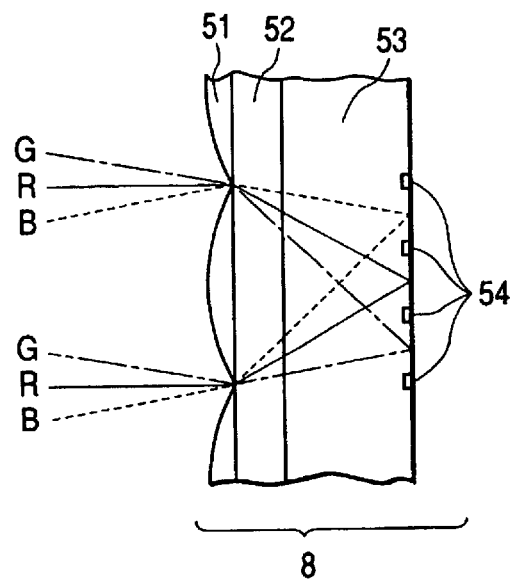
FIG. 35 is a diagram to show the internal structure and optical paths of the image display element in the fifth embodiment.
Figure 36:
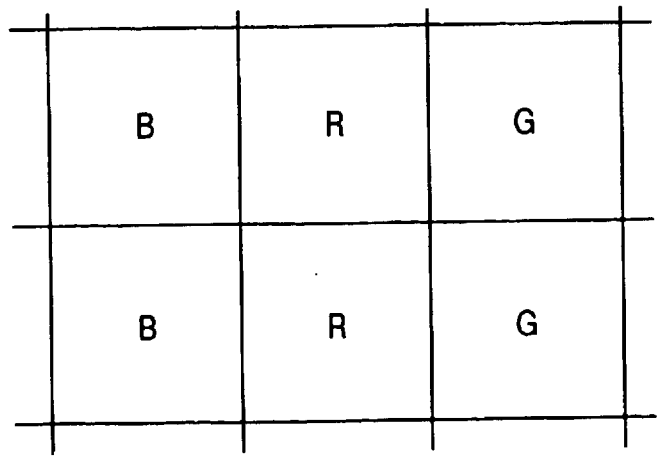
FIG. 36 is a diagram to show a positional relation between light beams of the respective colors and pixels of the image display element in the fifth embodiment.
Figure 37:
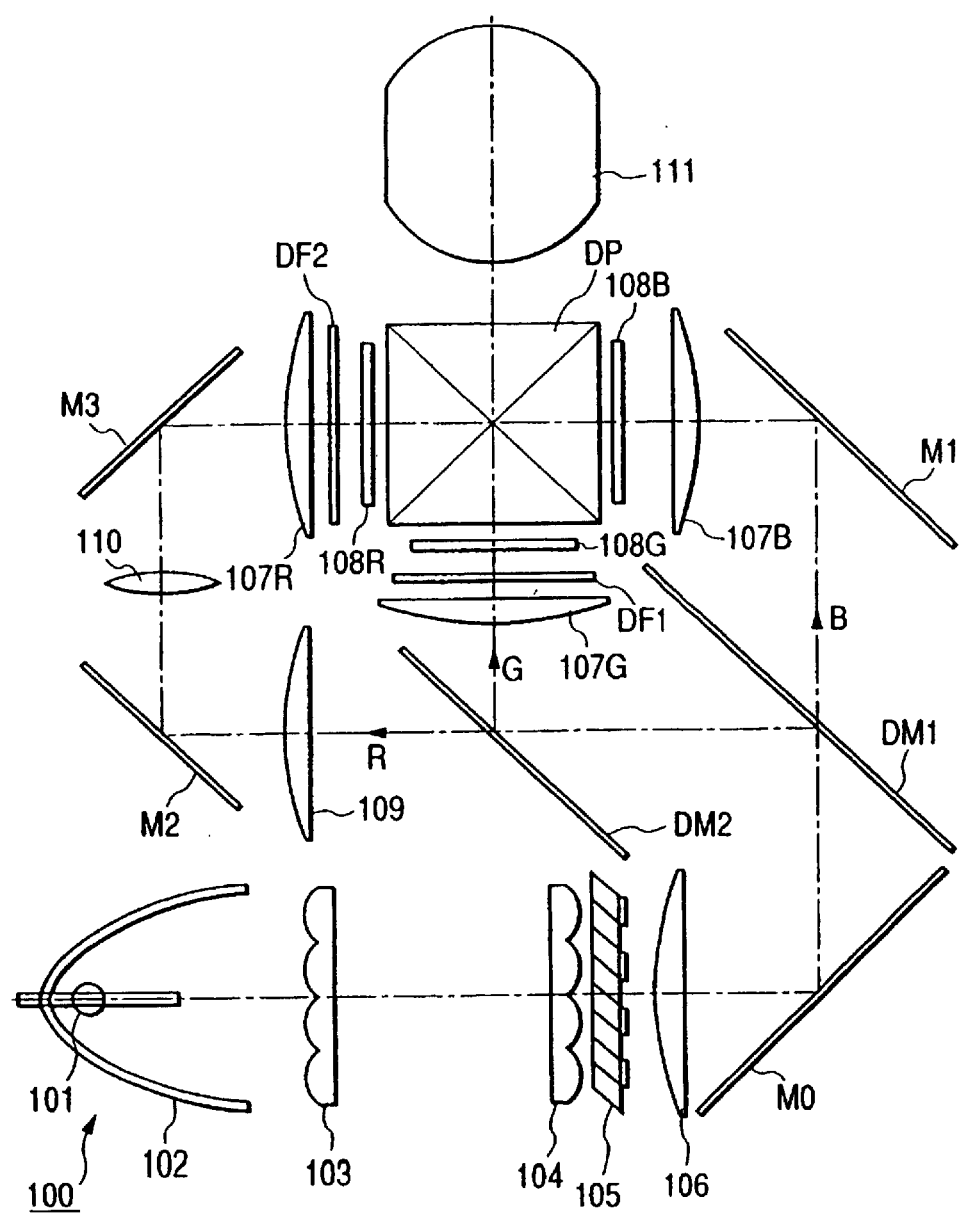
FIG. 37 is a structural diagram of the conventional example.
Figure 38:
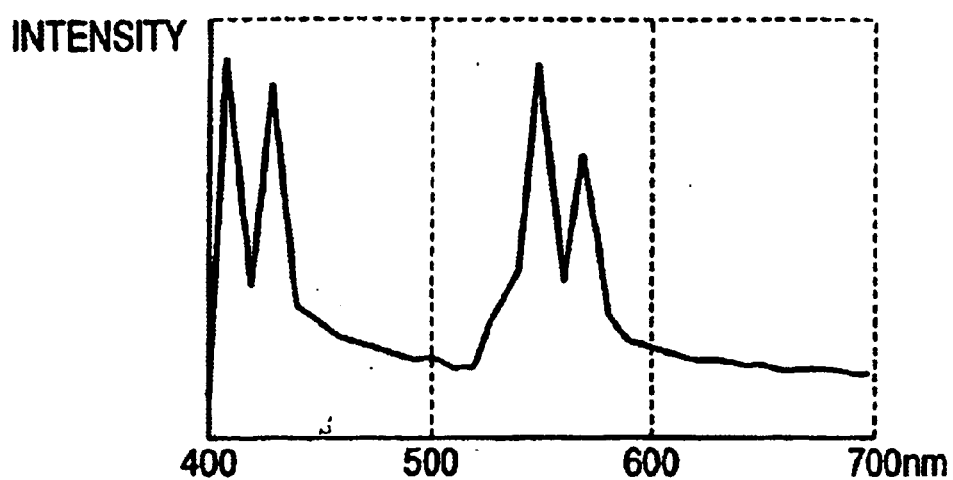
FIG. 38 is a diagram to show the spectral distribution of the light source in the conventional example.
Figure 39:
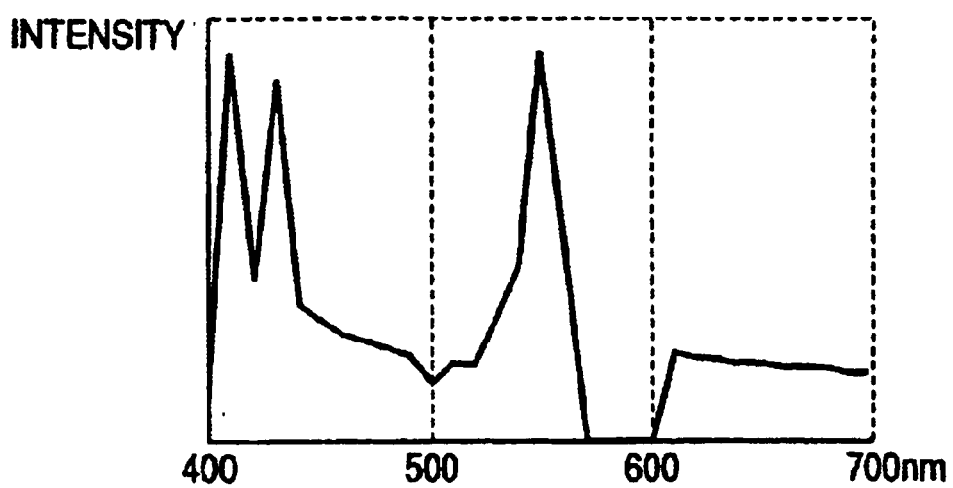
FIG. 39 is a diagram to show the spectral distribution after the composition of the colors in the conventional example.
Figure 40A:
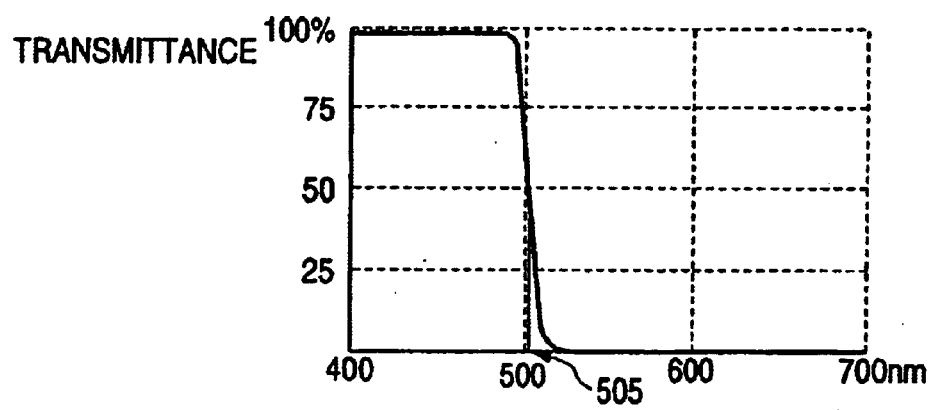
FIGS. 40A and 40B are diagrams to show the spectral transmittances of the dichroic mirrors in the conventional example.
Figure 40B:
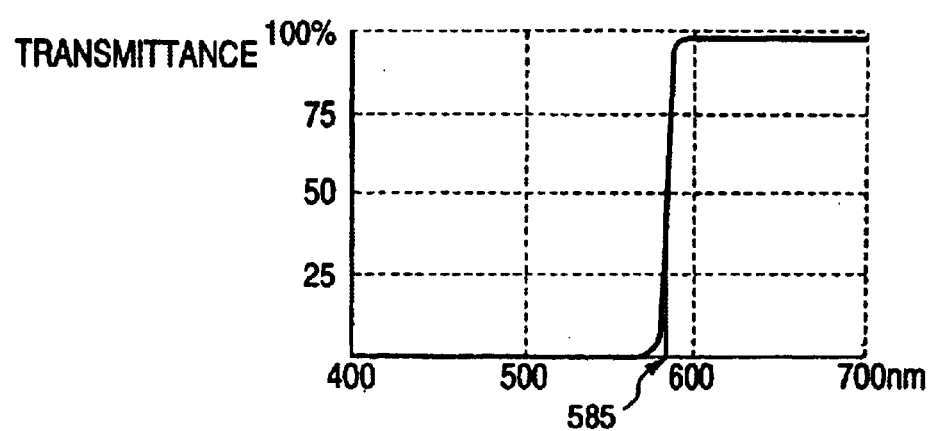

FIG. 34, FIG. 35, and FIG. 36 are schematic diagrams to show the optical paths of the respective color beams in Embodiment 5, to show the internal structure of the image display element 8 and the optical paths of the respective color beams, and to show the layout of the pixels, respectively.

As compared with above Embodiment 4, this Embodiment 5 is different from Embodiment 4 only in that the optical paths of red (R) and green (G) and the corresponding pixels thereto are interchanged, and the other structure is similar to that in above Embodiment 4. Therefore, the overlapping part with Embodiment 4 will be omitted from the description herein.

When the color-selecting optical element SC51 having the spectral reflectance characteristics of FIG. 33 is present in the optical path, the display is in the state with priority to brightness in which the wavelength band of 570 nm to 600 nm is added to the color beam of green (G). When the element SC51 is present outside the optical path, the display is in the state with priority to color reproducibility in which the wavelength band of 570 nm to 600 nm is not used for the green light.

In the case of the present embodiment, the element SC51 does not have to be limited to the use of the dichroic mirror, but a mirror that reflects the whole band of visible light may also be used.

The movement of the color-selecting optical element SC51 into or out of the optical path is implemented in the directions of arrows in the figure by the mechanism illustrated in FIG. 7 or FIG. 8, and whether the element SC51 is in the optical path can be electrically detected, as in Embodiment 4. Since the structure of the control circuit and the driving method for displaying the images of the respective colors in the image display element are the same as those in Embodiment 3, Embodiment 5 can also achieve the same effect as Embodiment 3.

The embodiments described above were the examples using the transmissive image display elements, but the reflective image display element(s) may also be used in the present invention.

The present invention has been described heretofore with the examples wherein the beams of the three colors of R, G, and B were incident simultaneously to at least one image display element, but the present invention can also be applied to known display devices in which the beams of the three colors are incident sequentially in a common direction to one image display element. An example of the known element used in this structure is such a reflective display element as to effect optical modulation by swinging or displacing the reflective surface so as to implement reflection deflection or reflection diffraction of incident light (see Japanese Patent Application Laid-Open No. 8-214243).

It is also noted here that a band cut filter with the spectral characteristics illustrated in FIG. 42 of the conventional example can also be used as a wavelength-selecting optical element.

Described below are specific examples of image processing apparatus (color correction circuit) which can be used in the projection display apparatus in each of the embodiments described above.

A feature of some specific examples described below is an image processing apparatus used in the display apparatus for forming the image by use of light of red, green, and blue, the image processing apparatus comprising detection means for detecting whether light of a specific wavelength band in the visible band is used as light of red or green, attenuating means for attenuating a video signal of red or green, addition means for adding the attenuated video signal to a video signal of blue, and control means for controlling the addition means, based on the result of detection of the detection means.

Another feature of some specific examples is an image processing apparatus used in the display apparatus for forming the image by use of light of red, green, and blue, the image processing apparatus comprising detection means for detecting whether light of a specific wavelength band in the visible band is used as light of red or green, subtraction means for generating a difference signal between a video signal of red or green and a video signal of blue, attenuating means for attenuating the difference signal, addition means for adding the attenuated difference signal to the video signal of blue, and control means for controlling the addition means, based on the result of detection of the detection means.

Embodiment 1 of the color correction circuit of the image processing apparatus will be described in detail by reference to the drawings.

Figure 43:
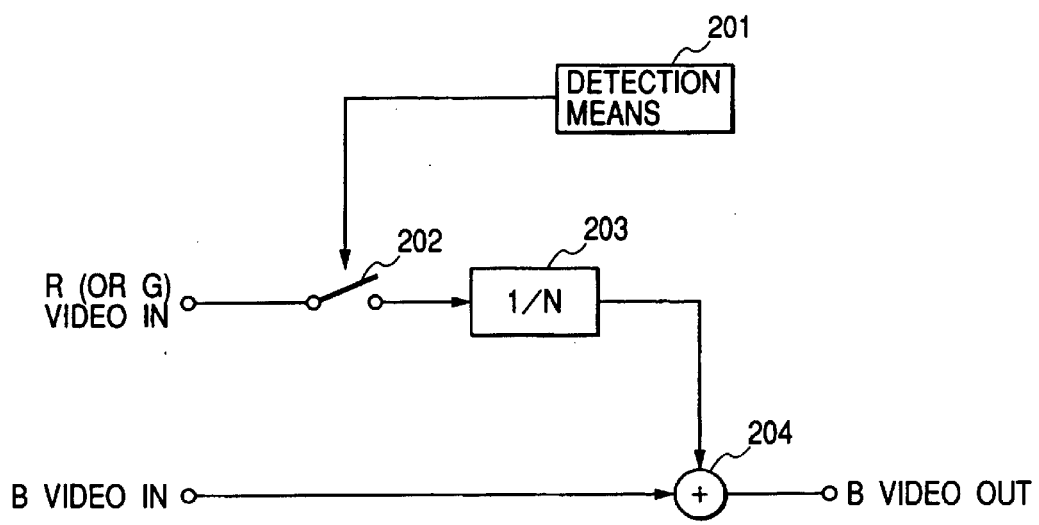
FIG. 43 is a block diagram to show the structure of Embodiment 1 of a color correction circuit.

FIG. 43 is a block diagram to show the structure of the color correction circuit in the present embodiment. In FIG. 43, reference numeral 201 designates a detection means, 202 a switch means, 203 an attenuating means, and 204 an addition means of video signals. The detection means 201 detects whether the light in the wavelength band of 570 nm to 600 nm is to be used, by detecting the position (inside or outside) of the color-selecting optical element relative to the optical path as described in each of the embodiments described above, and connects the red (or green) video signal to the attenuating means 203 by closing the switch means 202 when the light in the wavelength band of 570 nm to 600 nm is used. The attenuating means 203 attenuates the red (or green) video signal at a predetermined ratio. The attenuated red (or green) video signal is added to the blue video signal at the addition means 204 to form a blue video signal at the subsequent stage.

Figure 44:
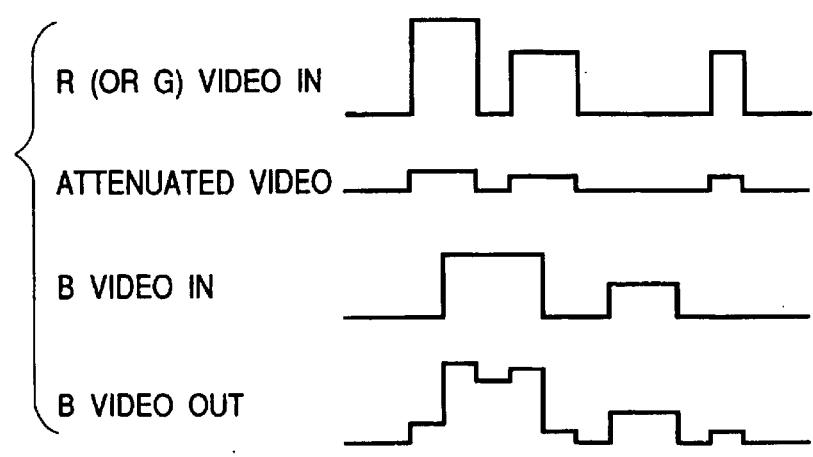
FIG. 44 is a waveform diagram to explain the operation of the color correction circuit of FIG. 43.

This operation is illustrated in the waveform diagram of FIG. 44. Whether the light in the wavelength band of 570 nm to 600 nm is used or not is implemented, for example, by moving the color-selecting optical element into or out of the optical path of red (or green). For example, when the color-selecting optical element is set in the optical path, the light in the wavelength band of 570 nm to 600 nm is not used. When the color-selecting optical element is set outside the optical path, the light in the wavelength band of 570 nm to 600 nm is used. Therefore, the detection means 201 is nothing but a means that detects the position of this color-selecting optical element depending upon the movement thereof into or out of the optical path.

Figure 45:
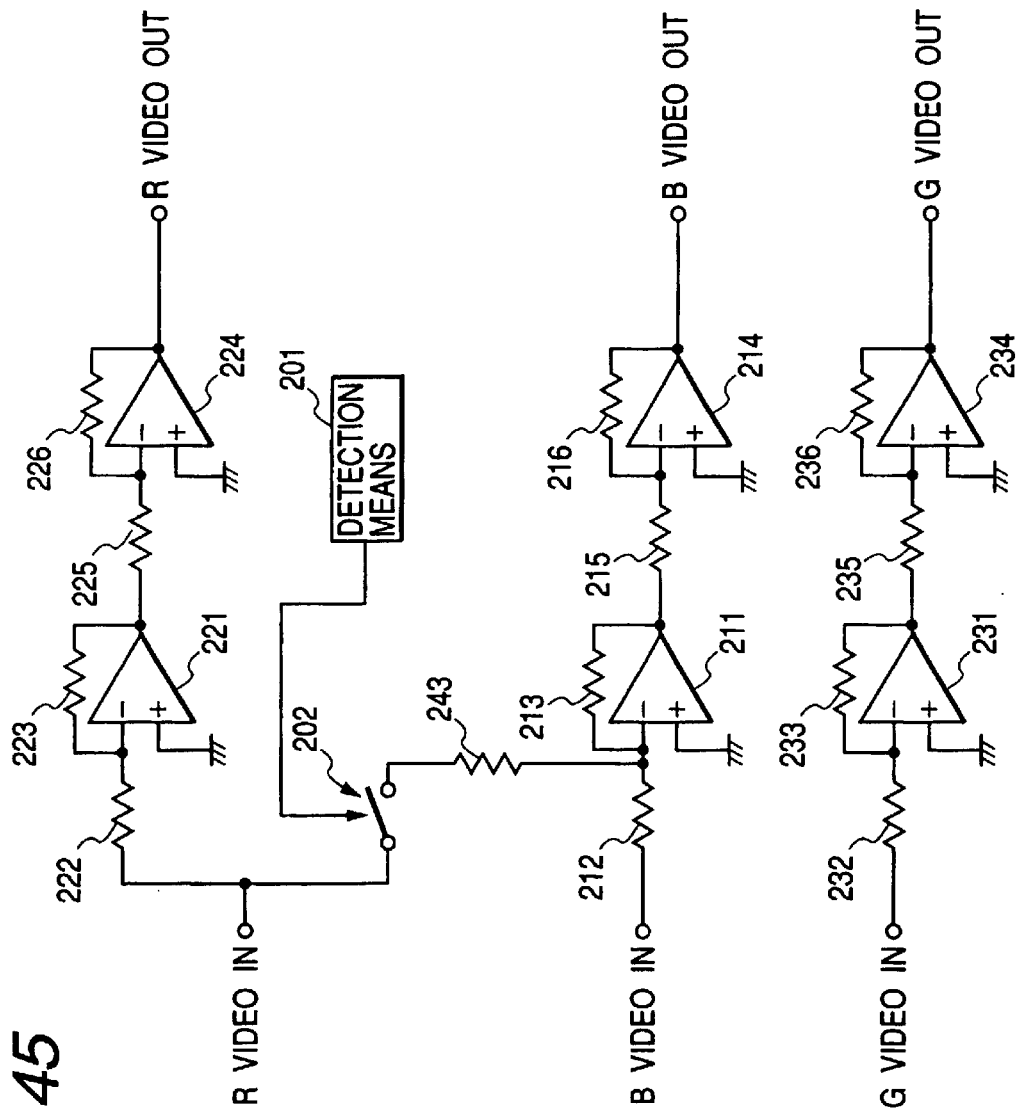
FIG. 45 is a block diagram to show the detailed structure of the color correction circuit of FIG. 43.

The further detailed structure of the color correction circuit is presented in FIG. 45, and the operation thereof will be described below.

Numeral 211 designates an operational amplifier, and an inverting input terminal and an output terminal thereof are coupled via feedback resistor 213. The blue video signal is entered through resistor 212 into the inverting input terminal. Further, the red video signal is entered through switch 202 and resistor 243 into the inverting input terminal. A non-inverting input terminal of the operational amplifier 211 is connected to the ground or to a fixed potential. The operational amplifier 211, feedback resistor 213, and resistor 212 compose an inverting amplifier. The resistance of the resistor 243 is set to be greater than the resistance of the feedback resistor 213, whereby the operational amplifier 211, the feedback resistor 213, and the resistor 243 constitute an attenuator. An adder is constructed by connecting the blue video signal and the red video signal through the resistor 212 and through the resistor 243, respectively, to the inverting input terminal of the operational amplifier 211. In this structure, when the detection means 201 detects presence of the color-selecting optical element in the optical path, the switch 202 becomes opened, so that the operational amplifier 211 operates only as an inverting amplifier, to output the pure blue signal. When the detection means 201 detects absence of the color-selecting optical element in the optical path, the switch 202 becomes closed, so that the red video signal is entered through the resistor 243 into the inverting input terminal of the operational amplifier 211. In this case the operational amplifier 211 attenuates the red video signal and outputs a signal resulting from the addition of the blue video signal and the attenuated red video signal. An operational amplifier 214 and resistors 215, 216 compose an inverting amplifier which converts the negative video signal obtained as a result of inversion in the operational amplifier 211, back into a positive video signal. Operational amplifiers 221 and 224 and operational amplifiers 231 and 234 are interposed each in the signal line in the same structure as the operational amplifiers 211 and 214, for the purpose of matching a delay of the red video signal and the green video signal, respectively, with that of the blue video signal. In this structure it is conceivable that the amplitude of the blue video signal after the addition of the red video signal exceeds an input level at the subsequent stage. In this case a limiter or the like needs to be provided so as to maintain the signal level below the fixed level.

Figure 46:
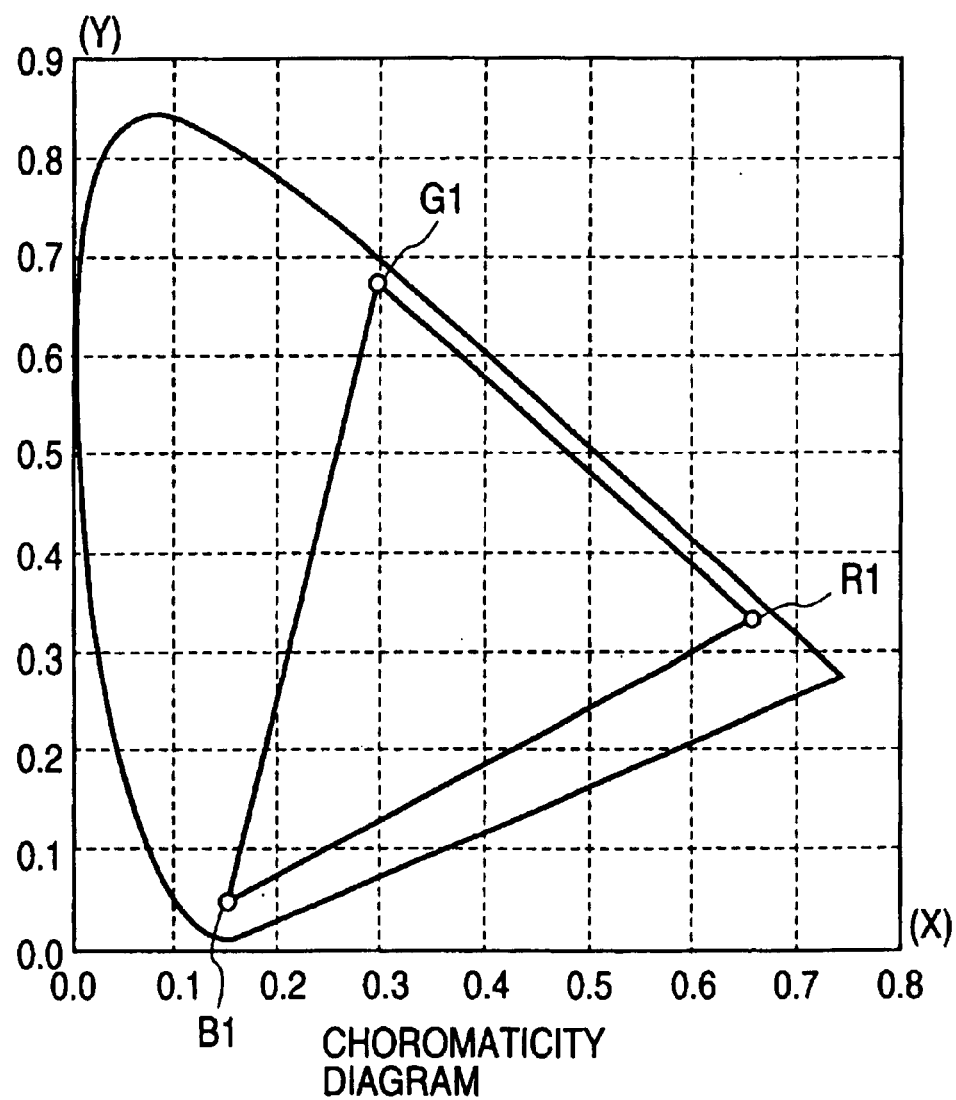
FIG. 46 is a chromaticity coordinate diagram to explain the color reproduction area.
Figure 47:
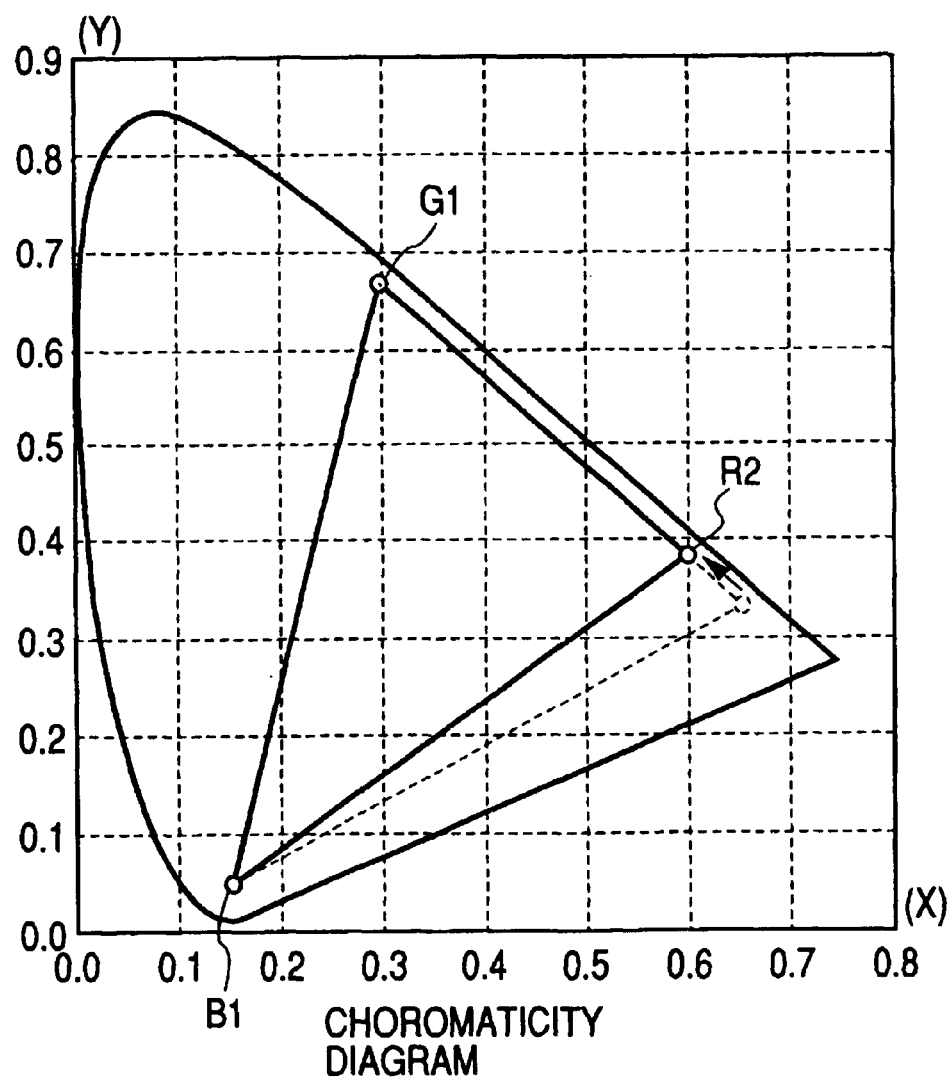
FIG. 47 is a chromaticity coordinate diagram to explain the color reproduction area.
Figure 48:
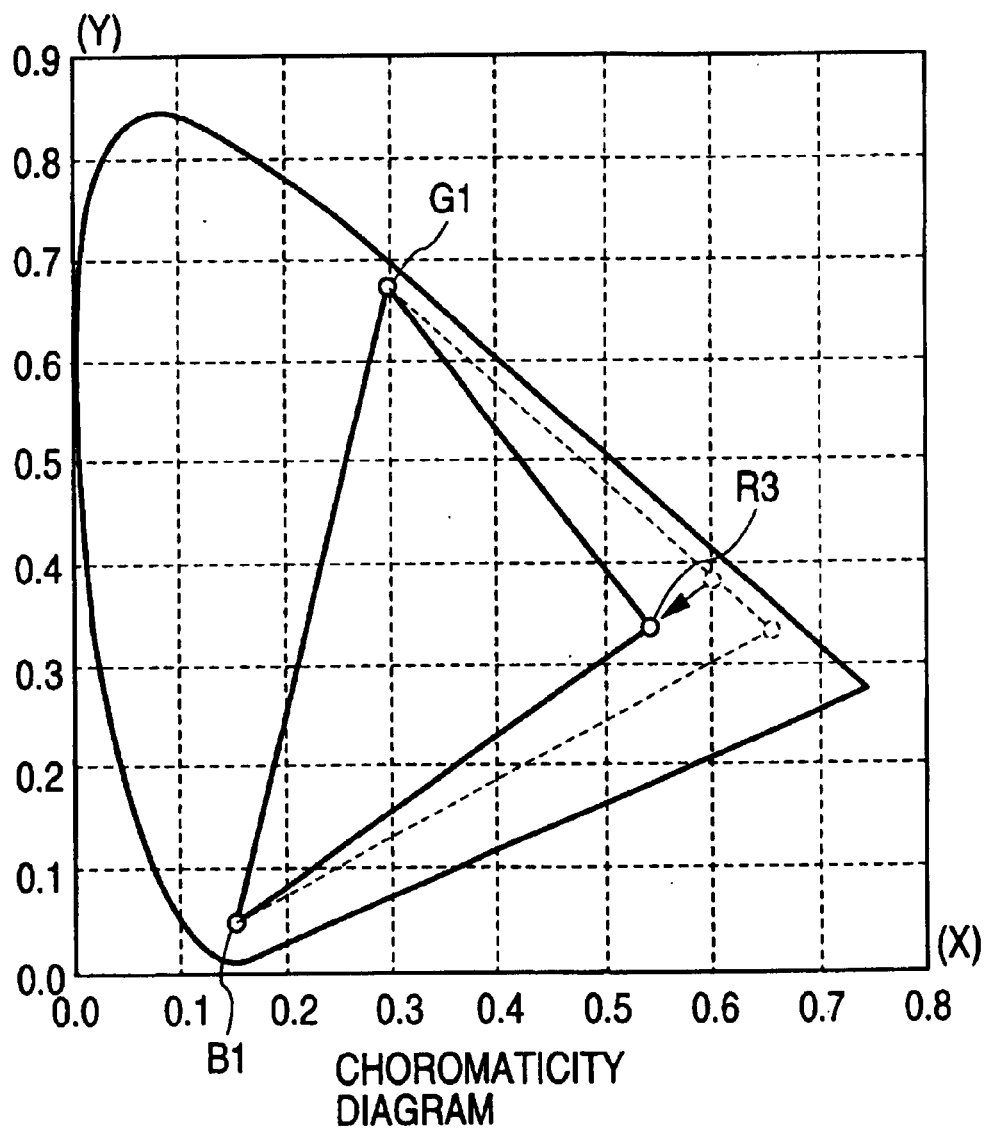
FIG. 48 is a chromaticity coordinate diagram to explain the color reproduction area.

The action of color reproduction with color correction will also be described herein by reference to FIGS. 46, 47, and 48. When the color-selecting optical element is present in the optical path, the color reproduction area is a region of a triangle indicated by R1, G1, and B1 of FIG. 46 and color reproduction with high purity can be implemented in each single color of R, G, and B. The color image display with priority to color reproducibility is presented accordingly. When the color-selecting optical element is retracted from the optical path, the light in the wavelength band of 570 nm to 600 nm is added to the optical path of red and thus the color image display with priority to brightness can be presented. However, without any correction, the color reproduction area is a region of a triangle indicated by R2, G1, B1 of FIG. 47 wherein the red reproduction area is shifted toward green. Thus red becomes orange. By using the color correction circuit to add the blue light to the red light, the red reproduction area R2 is shifted toward blue like a triangle indicated by R3, G1, and B1 of FIG. 48. When the red reproduction area is shifted toward blue in this way to lower the purity of red by use of the light in the wavelength band of 570 nm to 600 nm, more natural color reproduction can also be implemented in the case of the color image display with priority to brightness.

This embodiment demonstrated the structure in which the light in the wavelength band of 570 nm to 600 nm was taken into the red light, but, for adding the light of this wavelength band to the green light, the circuitry is structured so as to add the green video signal to the blue video signal.

Figure 51:
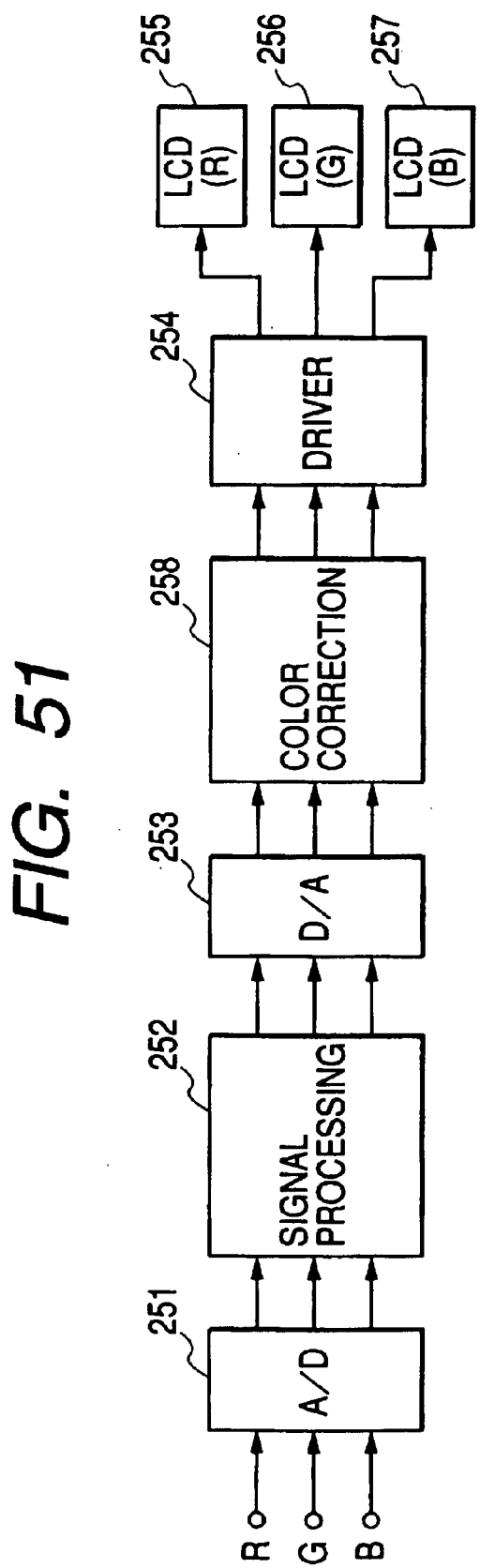
FIG. 51 is a block diagram to show another configuration of signal processing in the image display apparatus.

Incidentally, signal processing of the image display device is carried out normally by the configuration illustrated in FIG. 49. In FIG. 49, an A/D converter 251 converts the input video signals to digital signals and the digital signals are supplied to a signal processing circuit 252. The signal processing circuit 252 executes such digital processing as to change the video signals entered as digital signals, to signals suitable for the image display elements. The digitally processed video signals are converted to analog video signals by D/A converter 253 and thereafter supplied via driver 254 to the respective image display elements 255, 256, 257 of R, G, and B. Therefore, the color correction circuit can be located before the A/D converter 251, as illustrated in FIG. 50. In this case the color-corrected video signals are subjected to the digital processing. The color correction circuit can also be interposed after the D/A converter 253, as illustrated in FIG. 51. In this case the video signals after the digital processing are subjected to the color correction. Further, as seen from the structure of FIG. 49, the input video signals are converted once to digital signals in the A/D converter 251. Therefore, the color correction processing can also be implemented as digital processing. In this case the function equivalent to that in the block diagram illustrated in FIG. 43 is structured in the form of a digital circuit.

As described above, for the display with priority to brightness by making use of the light in the wavelength band of 570 nm to 600 nm, Embodiment 1 of the color correction circuit can realize better-balanced color reproduction with correction for chromaticity coordinates by adding the blue light upon the display of the color to take in the light in the wavelength band of 570 nm to 600 nm.

(Embodiment 2 of the Color Correction Circuit)

Figure 52:
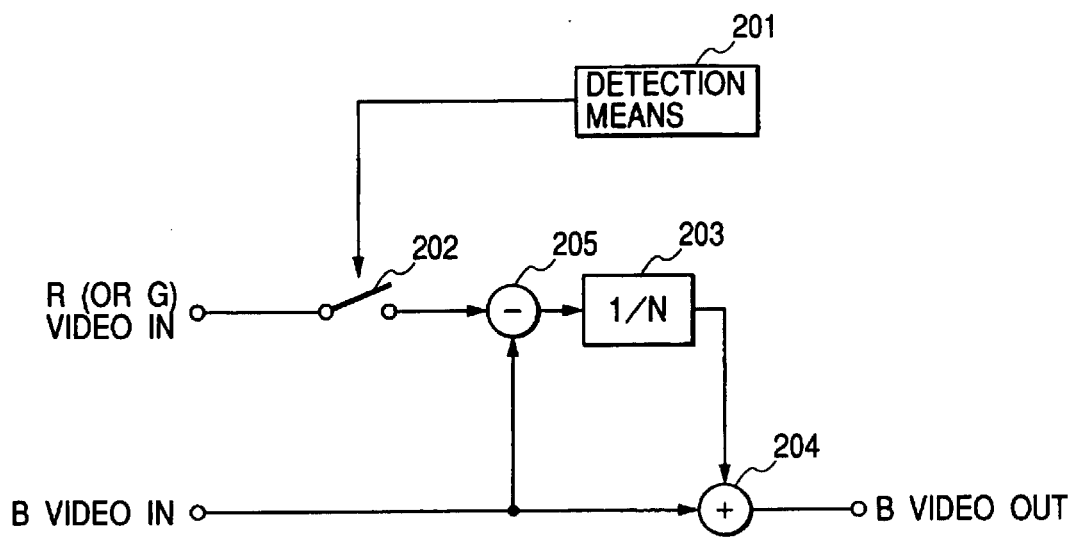
FIG. 52 is a block diagram to show the structure of Embodiment 2 of the color correction circuit.

FIG. 52 is a block diagram to show Embodiment 2 of the color correction circuit.

Numeral 201 denotes a detection means, 202 a switch means, 205 a subtraction means, 203 an attenuating means, and 204 an addition means of video signals. The detection means 201 is the same means as that in FIG. 43 and detects whether the light in the wavelength band of 570 nm to 600 nm is to be used. When the light in the wavelength band of 570 nm to 600 nm is used, the switch means 202 is closed to connect the red (or green) video signal to the subtraction means 205. The subtraction means 205 generates a difference signal between the red (or green) video signal and the blue video signal and the attenuating means 203 attenuates the difference signal at a ratio of 1/N. The 1/N-attenuated difference signal is added to the blue video signal in the addition means 204 to form a blue video signal at the subsequent stage.

Figure 53:
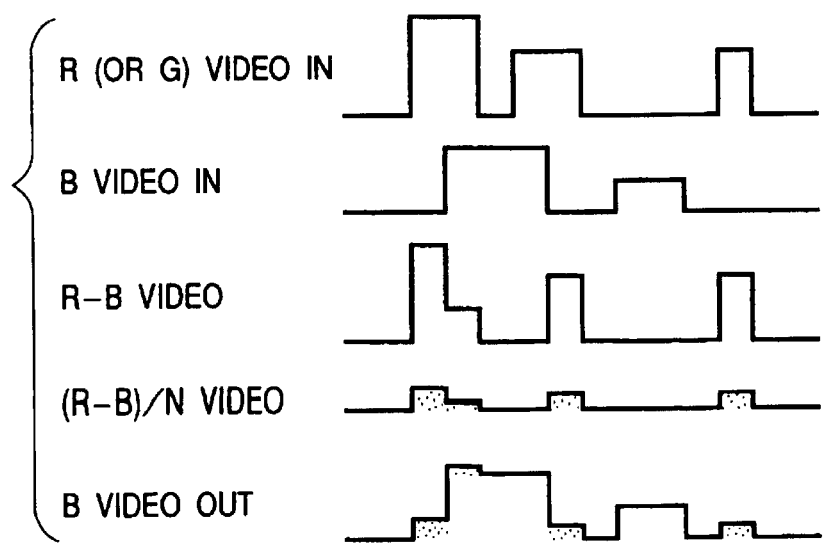
FIG. 53 is a waveform diagram to explain the operation of the color correction circuit of FIG. 52.

This operation is illustrated in the waveform diagram of FIG. 53. A feature of the operation in this embodiment is that the attenuated difference signal is added as color correction to the blue video signal only when the red (or green) video signal is larger than the blue video signal.

Figure 54:
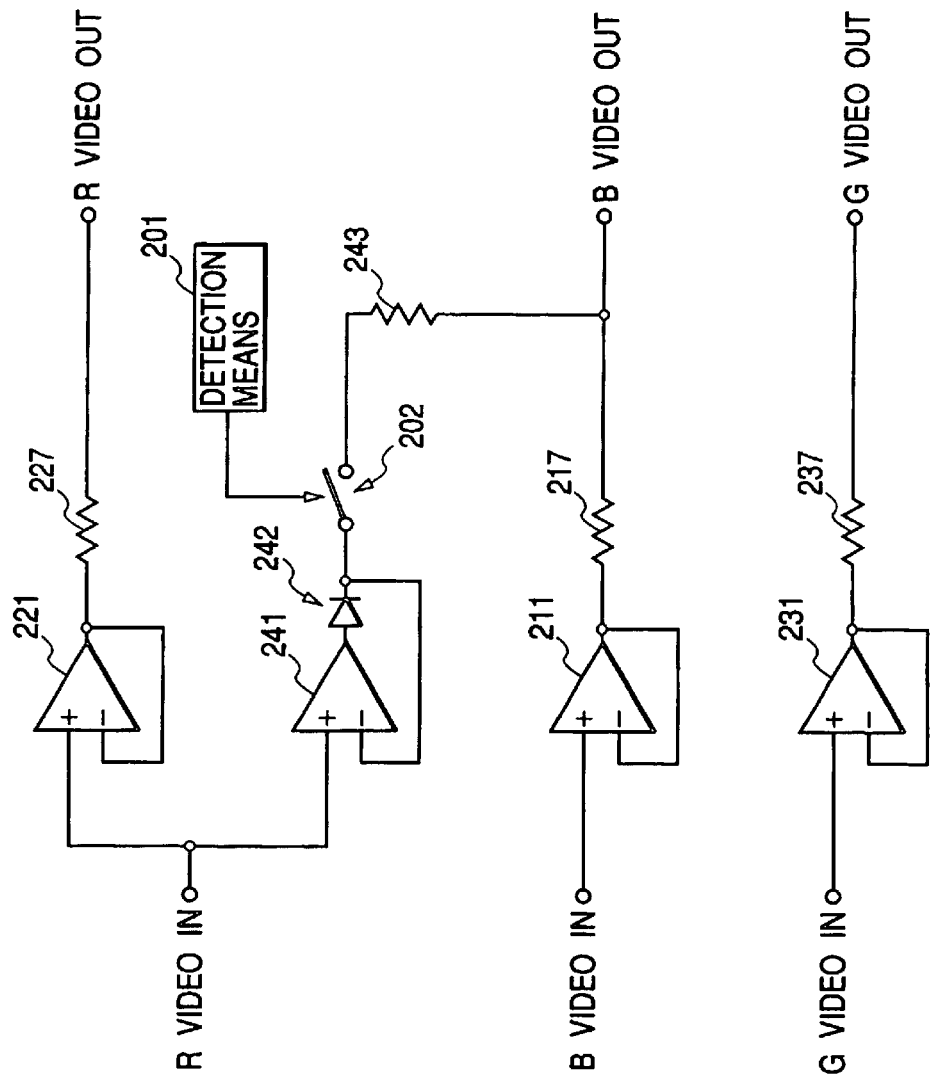
FIG. 54 is a block diagram to show the detailed structure of the color correction circuit of FIG. 52.

The further detailed structure is presented in FIG. 54 and the operation thereof will be described next. Numeral 211 designates an operational amplifier, and an inverting input terminal and an output terminal thereof are coupled directly to each other to compose a voltage follower. The blue video signal is entered to a non-inverting input terminal. Numeral 241 denotes an operational amplifier and its inverting input terminal and output terminal are coupled to each other through diode 242. The anode of the diode 242 is connected to the output terminal of the operational amplifier 241, whereby the operational amplifier 241 acts as a voltage follower of only a current source. The red video signal is entered into the non-inverting input terminal of the operational amplifier 241. The output of the voltage follower composed of the operational amplifier 241 and the diode 242 is connected via switch 202, resistor 243, and resistor 217 to the output terminal of the operational amplifier 211. In this structure the operational amplifier 211, the operational amplifier 241, the resistor 217, and the resistor 243 constitute the subtraction means 205, attenuator 203, and addition means 204 illustrated in FIG. 52. The attenuation ratio of the attenuator 203 is determined by a ratio of the resistances of the resistor 217 and resistor 243. In this structure, when the detection means 201 detects presence of the color-selecting optical element in the optical path, the switch 202 is opened to disconnect the operational amplifier 241 from the operational amplifier 211, so that only the pure blue signal is outputted. When the detection means 201 detects absence of the color-selecting optical element in the optical path, the switch is closed to make the connection between the operational amplifier 241 and the operational amplifier 211. If the red video signal is larger than the blue video signal at this time, a current will flow through the resistor 243 and resistor 217 from the operational amplifier 241 to the operational amplifier 211. Therefore, the blue video signal output is a signal resulting from addition of a value obtained by dividing the difference between the red video signal and the blue video signal by the resistance of the resistor 217 and resistor 243, to the input blue video signal. If the red video signal is smaller than the blue video signal on the other hand, a current will become about to flow from the operational amplifier 211 to the operational amplifier 241, but no current will result, because the diode 242 connected to the output of the operational amplifier 241 will block it. Therefore, the input blue video signal is outputted as a blue video signal as it is. The operational amplifier 221 and the resistor 227 or the operational amplifier 231 and the resistor 237 are interposed in the signal line in the same structure as the operational amplifier 211 and resistor 217 for the blue video signal, for the purpose of matching the delay of the red video signal or the green video signal to the delay of the blue video signal.

The present embodiment demonstrated the structure where the light in the wavelength band of 570 nm to 600 nm was taken into the red light, but, for taking the light in this wavelength band into the green light, the circuit is configured so as to add the green video signal to the blue video signal.

The present embodiment showed the example of processing of color correction with analog signals, but the processing can also be carried out with digital signals. In that case, the function equivalent to that in the block diagram of FIG. 52 can be constructed of a digital circuit.

As described above, in the case of the display with priority to brightness by making use of the light in the wavelength band of 570 nm to 600 nm, Embodiment 2 of the color correction circuit can realize better-balanced color reproduction with correction for chromaticity coordinates by adding the blue light upon the display of the color to take in the light in the wavelength band of 570 nm to 600 nm.

Further, since the addition means becomes enabled only when the video signal of the color to take in the light in the wavelength band of 570 nm to 600 nm is greater than the blue video signal, it can prevent the intrinsic blue video signal from becoming smaller because of the addition of the difference signal when the video signal of the color to take in the light in the wavelength band of 570 nm to 600 nm is smaller than the blue video signal.

(Embodiment 3 of the Color Correction Circuit)

Figure 55:
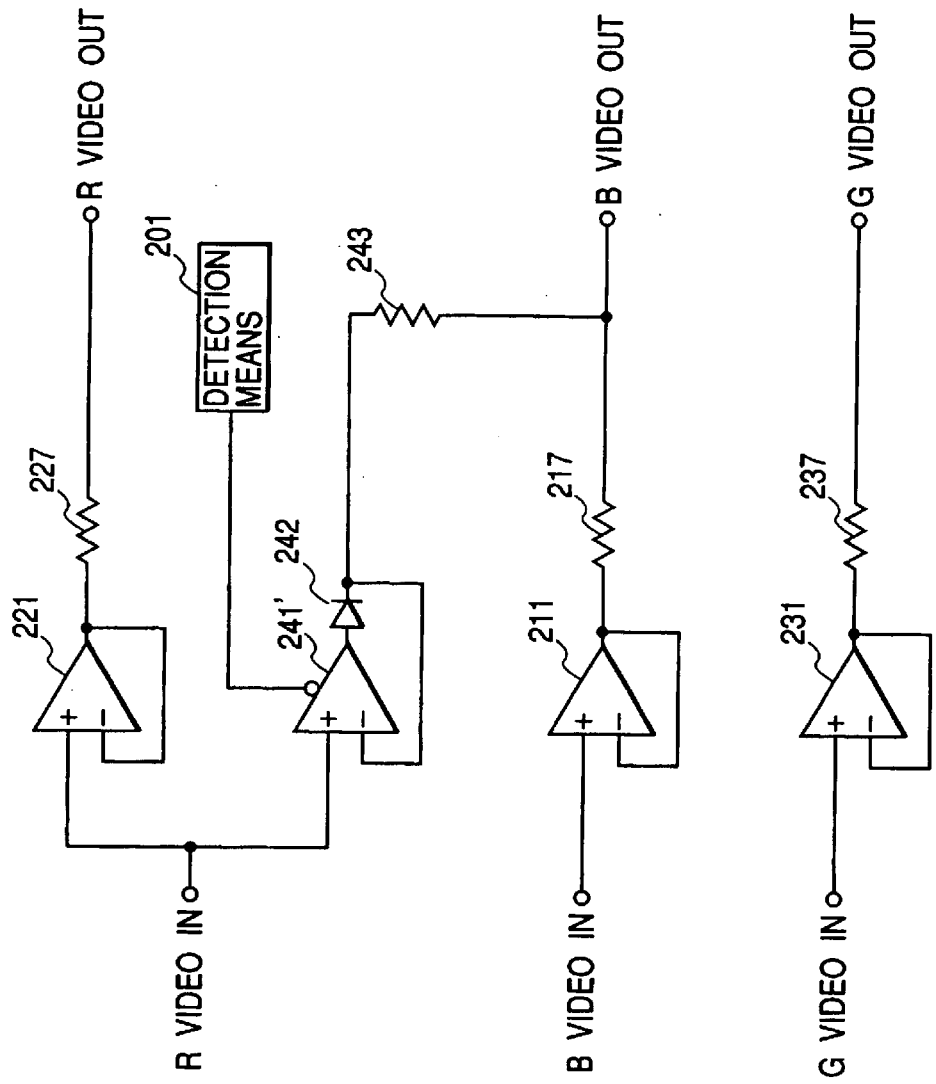
FIG. 55 is a block diagram to show the structure of Embodiment 3 of the color correction circuit.

FIG. 55 shows the structure of Embodiment 3 of the color correction circuit.

Numeral 241' designates an operational amplifier with a disabling function, which is a circuit wherein the output of the operational amplifier 241' goes into a high-impedance state when disabled. Since the operational amplifier 241' is considered to be a combination of the operational amplifier 241 with the switch 202 in Embodiment 2 of the color correction circuit of FIG. 54, the operation of the circuit in this Embodiment 3 of the color correction circuit is equivalent to the operation of the circuit in Embodiment 2 of the color correction circuit.

What is claimed is:

1. An image display apparatus comprising:
   a color-separating optical system for separating light from a light source into a first color light beam, a second color light beam, and a third color light beam, which are different in color from one another;
   a first display element for modulating the first color light beam to form an image of the first color;
   a second display element for modulating the second color light beam to form an image of the second color;
   a second display element for modulating the second color light beam to form an image of the second color;
   a third display element for modulating the third color light beam to form an image of the third color;
   a drive circuit for driving said first display element with a first image signal corresponding to the first color, said second display element with a second image signal corresponding to the second color, and said third display element with a third image signal corresponding to the third color; and
   a filter that is adapted to be moved into or ourt of an optical path of the first color, wherein purity of the first color is rendered a first purity when the filter is off the optical path of the first color, and purity of the first color is rendered a second purity that is higher than the first purity when the filter is in the optical path of the first color, wherein said drive circuit drives said second display element with said second image signal when said filter is in the optical path of the first color and said drive circuit drives said second display element with a signal produced by adding a signal produced based on said first image signal to said second image signal when said filter is off the optical path of the first color.

2. An image display apparatus according to claim 1, wherein said first color is red, said second color is blue and said third color is green.

3. An image display apparatus according to claim 1, wherein said first color is green, said second color is blue, and said third color is red.

4. An image display apparatus according to claim 1, wherein said filter is a cut band filter or an edge filter.

5. An image display apparatus according to claim 1, wherein said signal produced by adding a signal produced based upon said first image signal to said second image signal is produced by adding an attenuated first image signal, to said second image signal.

6. An image display apparatus according to claim 5, wherein said attenuated first image signal is an image signal that a red or green image signal is attenuated, sand said second image signal is a blue image signal.

7. An image display apparatus according to claim 1, wherein said signal is produced by adding a signal prooduced based on said first image signal to said second image signal is produced by adding an attenuation differential signal that is an attenuated differential signal between said first image signal and said second image signal, to said second image signa.

8. An image display apparatus according to claim 7, wherein said attenuation differential signal is a signal that a differential signal between a red or green image signal and a blue image signal is attenuated, and said second image signal is the blue image signal.

9. An image display apparatus according to claim 1, further comprising detection means for detecting a position of said filter, wherein said drive circuit drives said second dislay element in accordance with a signal, from said detection means, indicative of said filter being off the optical path of the first color.

10. An image display apparatus according to claim 1 further comprising:
   a combining system for combining first light emerging from said first display element, second light emerging from said second display element, and third light emerging from said third display element; and
   a projection system for projecting the lights emerging from said combining system.

* * * * *

UNITED STATES PATENT AND TRADEMARK OFFICE
CERTIFICATE OF CORRECTION

PATENT NO.         : 7,064,773 B1
APPLICATION NO.    : 09/537025
DATED              : June 20, 2006
INVENTOR(S)        : Okuyama et al.

It is certified that error appears in the above-identified patent and that said Letters Patent is hereby corrected as shown below:

Title Page

Item No. "(56) References Cited", sub-heading "U.S. Patent Documents" add:

--5,623,281  4/1999  MARKANDEY et al.--.

Column 17

Lines 37-38, delete:

"a second display element for modulating the second color light bean to form an image of the second color,"

should be deleted as such language is identical to the previous two lines;

Line 47, change "into or ourt" to --into or out--;

Column 18

Line 23, change "sand said" to --and said--;

Lines 26-27, change "prooduced", to --produced--.

Signed and Sealed this

Sixth Day of March, 2007

JON W. DUDAS
*Director of the United States Patent and Trademark Office*